(12) United States Patent  (10) Patent No.: US 8,605,450 B2
Kaneshige et al.  (45) Date of Patent: Dec. 10, 2013

(54) IN-VEHICLE ELECTRIC STORAGE DEVICE

(75) Inventors: Masahiro Kaneshige, Hitachinaka (JP); Mitsutoshi Nakane, Hitachinaka (JP)

(73) Assignee: Hitachi Vehicle Energy, Ltd., Hitachinaka-shi (JP)

( * ) Notice: Subject to any disclaimer, the term of this patent is extended or adjusted under 35 U.S.C. 154(b) by 246 days.

(21) Appl. No.: 13/209,818

(22) Filed: Aug. 15, 2011

(65) Prior Publication Data

US 2012/0057316 A1 Mar. 8, 2012

(30) Foreign Application Priority Data

Sep. 3, 2010 (JP) .................................. 2010-197856
Apr. 8, 2011 (JP) .................................. 2011-086279

(51) Int. Cl.
*H05K 5/00* (2006.01)
*H05K 7/00* (2006.01)
*H05K 7/02* (2006.01)
*H05K 7/04* (2006.01)

(52) U.S. Cl.
USPC ........... 361/752; 361/730; 361/760; 361/807; 361/809; 361/810

(58) Field of Classification Search
USPC ......... 361/752, 320, 340, 315, 323, 386, 749, 361/758, 759, 760, 783, 784, 803, 730, 800, 361/807, 809, 810; 180/65.1; 174/138 E
See application file for complete search history.

(56) References Cited

U.S. PATENT DOCUMENTS 6,926,541 B2 * 8/2005 Takeuchi et al. ............. 439/76.2
8,440,339 B2   5/2013 Harada et al.

2008/0265586 A1   10/2008 Like et al.
2009/0226806 A1    9/2009 Kiya
2009/0258282 A1 * 10/2009 Harada et al. .................. 429/61
2010/0116570 A1    5/2010 Sugawara et al.

FOREIGN PATENT DOCUMENTS

CN  101395022 A  3/2009
CN  101552351 A  10/2009
CN  101678744 A  3/2010
DE  10 2008 010 808 A1  8/2009

(Continued)

OTHER PUBLICATIONS

Extended European Search Report dated Oct. 30, 2012 (Four (4) pages).

(Continued)

*Primary Examiner* — Timothy Thompson
*Assistant Examiner* — Ahmad D Barnes
(74) *Attorney, Agent, or Firm* — Crowell & Moring LLP

(57) ABSTRACT

An in-vehicle electric storage device includes: a battery block including a metal casing and battery cells; a control unit including a metal cabinet and a circuit board on which an electronic component is mounted, the control unit being on a top side of the battery block and monitoring a physical state of the battery cells; wherein the cabinet includes a case having a bottom plate and an open top surface and a cover closing the open top surface, the case has an internal boss protrudes toward inside of the case from a top side of the bottom plate and an external boss protrudes toward outside the case from a bottom side of the bottom plate, the circuit board is on a top side of the internal boss, and a top side of the casing is provided with a depressed portion in which the external boss is accommodated.

10 Claims, 16 Drawing Sheets

(56) References Cited

FOREIGN PATENT DOCUMENTS

| | | |
|---|---|---|
| JP | 10-246112 A | 9/1998 |
| JP | 2000-67836 A | 3/2000 |
| JP | 2000-223160 A | 8/2000 |
| JP | 2009-252460 A | 10/2009 |
| JP | 2010-113999 A | 5/2010 |
| JP | 2011-49012 A | 3/2011 |
| JP | 2011-71097 A | 4/2011 |
| WO | WO 01/97583 A2 | 12/2001 |
| WO | WO 2008/134251 A1 | 11/2008 |
| WO | WO 2009/103466 A1 | 8/2009 |

OTHER PUBLICATIONS

Chinese Office Action with English translation thereof dated Aug. 27, 2013 {Four (4) pages}.

* cited by examiner

F I G . 2
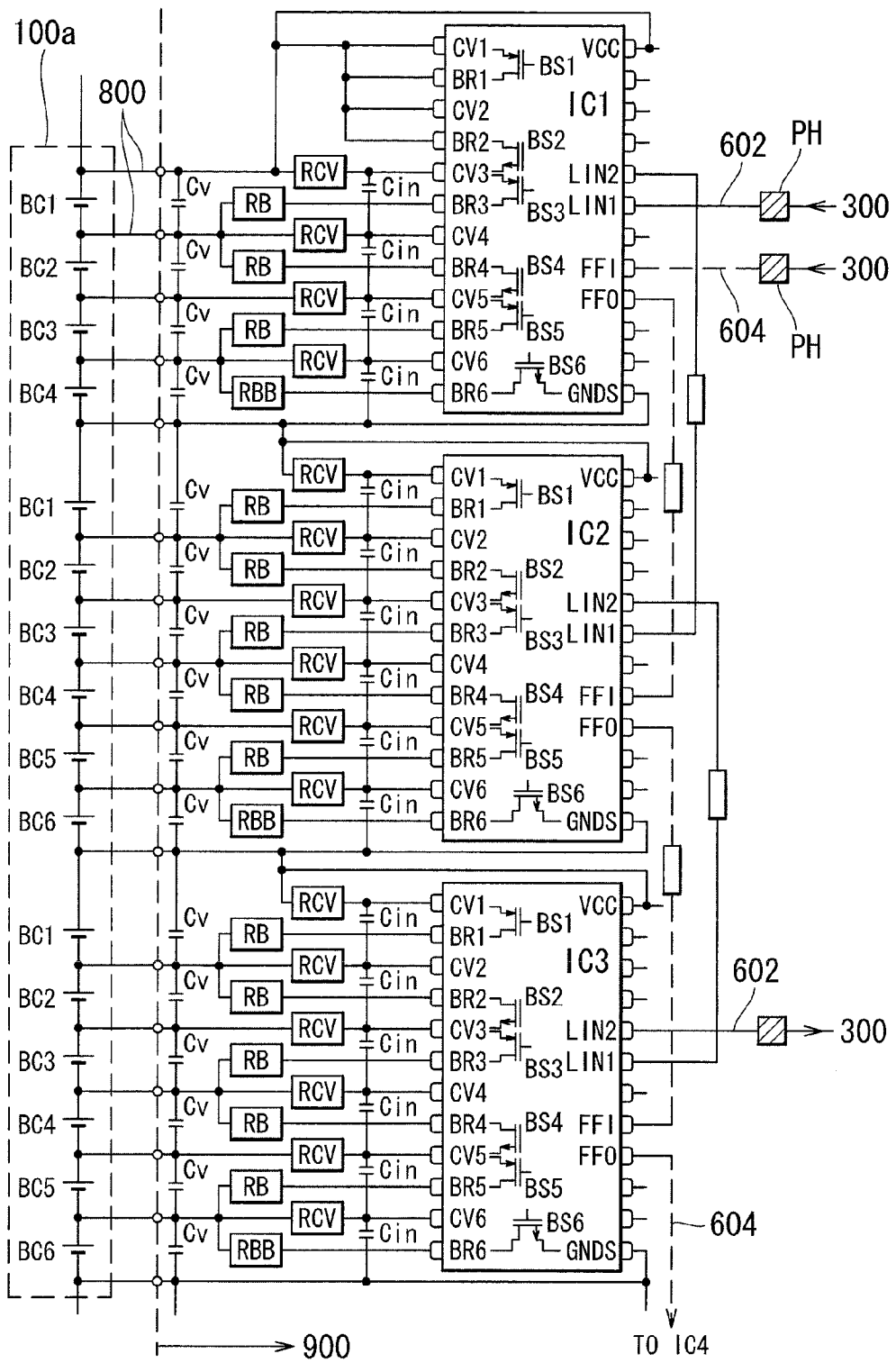

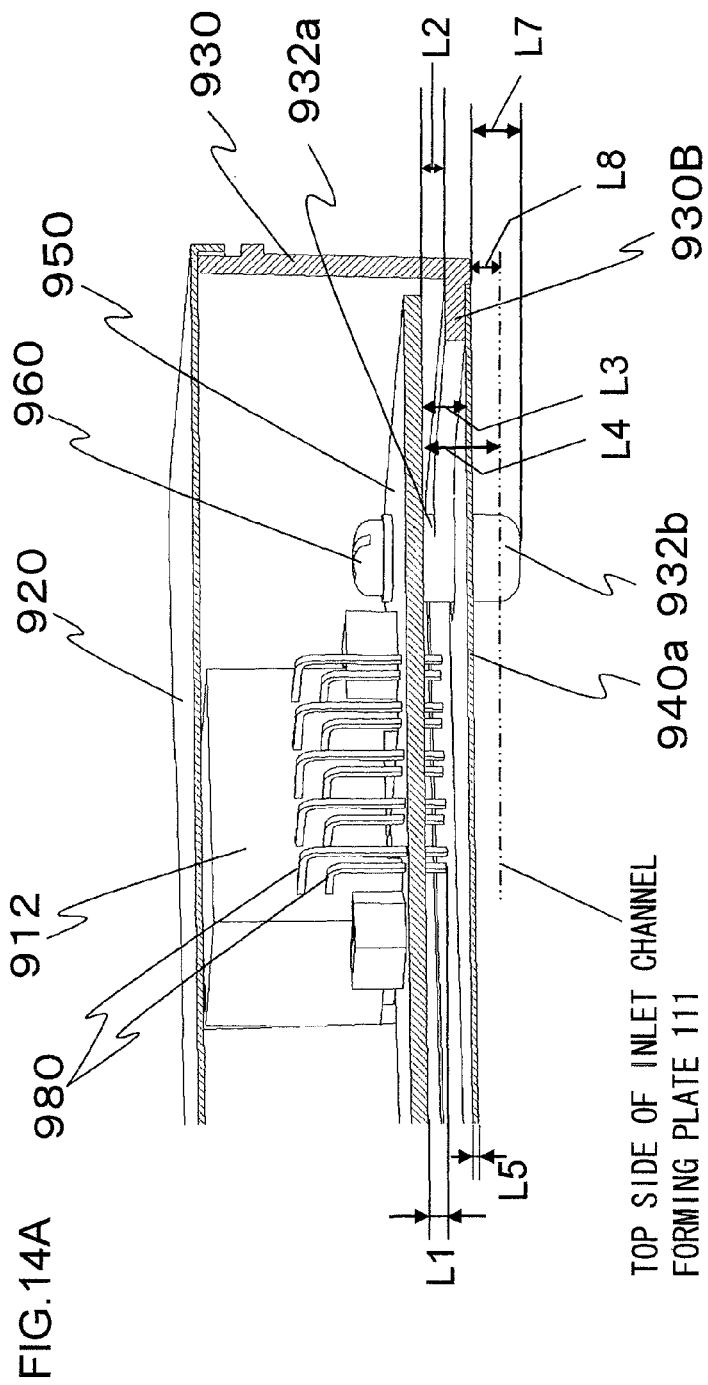
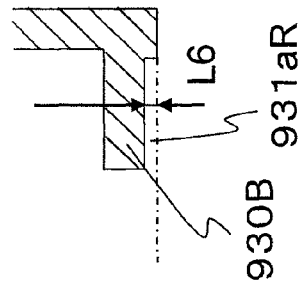
FIG.14A
FIG.14B

IN-VEHICLE ELECTRIC STORAGE DEVICE

INCORPORATION BY REFERENCE

The disclosure of the following priority applications are herein incorporated by reference:
Japanese Patent Application No. 2010-197856 filed Sep. 3, 2010
Japanese Patent Application No. 2011-086279 filed Apr. 8, 2011.

BACKGROUND OF THE INVENTION

1. Field of the Invention

The present invention relates to an in-vehicle electric storage device.

2. Description of Related Art

In recent years, hybrid vehicles and electric vehicles have attract attention due to enhancement of consciousness of conservation of energy and environmental problems. Hybrid vehicles and electric vehicles include batteries and obtain power from the batteries to drive the vehicles.

For example, the storage device for use in vehicles disclosed in Japanese Patent Publication Laid-open No. 2000-223160 includes a plurality of battery modules connected with a bus bar to form one block housed in a battery case. The battery case has a holder case that holds the battery modules and two end plates fixed thereto. A bus bar that is connected to the battery modules is incorporated in one of the end plates and a protective electric circuit is incorporated in the other of the end plates.

SUMMARY OF THE INVENTION

The position in which batteries are arranged in the vehicle may vary depending on the types of vehicles. However, regardless of the types of vehicles, there is a limitation on size of the battery since it should be arranged in a limited space, so that a size reduction of the battery is required.

According to the 1st aspect of the present invention, an in-vehicle electric storage device, comprises: a battery block including a metal casing and a plurality of battery cells accommodated in the metal casing; a control unit including a metal cabinet and a circuit board accommodated in the metal cabinet on which an electronic component is mounted, the control unit being set up on a top side of the battery block and monitoring a physical state of each of the plurality of the battery cells; wherein the cabinet includes a case having a bottom plate and an open top surface and a cover that closes the open top surface of the case, the case has an internal boss and an external boss on the bottom plate, the internal boss protruding toward inside of the case from a top side of the bottom plate and the external boss protruding toward outside the case from a bottom side of the bottom plate, the circuit board is set up on a top side of the internal boss, and a top side of the casing is provided with a depressed portion in which the external boss is accommodated.

According to the 2nd aspect of the present invention, it is preferred that in an in-vehicle electric storage device according to the 1st aspect, the in-vehicle electric storage device includes a plurality of the battery blocks, and the cabinet is connected and fixed to a top side of the plurality of the battery blocks so as to bridge them.

According to the 3rd aspect of the present invention, it is preferred that in an in-vehicle electric storage device according to the 1st aspect, a connector that is mounted on the circuit board, a lead of the connector protruding from a bottom side of the circuit board, and the bottom plate of the case is provided with an opening that faces the connector.

According to the 4th aspect of the present invention, it is preferred that a heat conduction member according to the 1st aspect that causes the circuit board and the case thermally contact each other is provided on the top side of the bottom plate, the heat conduction member contacting the circuit board.

According to the 5th aspect of the present invention, it is preferred that in an in-vehicle electric storage device according to the 3rd aspect, assuming a protrusion length of the lead that protrudes from the bottom side of the circuit board is S1, a protrusion height of an internal boss of the bottom plate is S2, and a distance between an extremity of the internal boss and a top side of the casing of the battery block is S3, S1, S2 and S3 satisfy a relationship of: $S2<S1<S3$.

According to the 6th aspect of the present invention, it is preferred that in an in-vehicle electric storage device according to the 5th aspect, the opening of the case is blocked by a blocking plate fixed to an outer side of the case, and assuming that a distance between the extremity of the internal boss and a top side thereof that faces the circuit board is S4, S1, S2 and S4 satisfy a relationship of: $S2<S1<S4$.

According to the 7th aspect of the present invention, the blocking plate in an in-vehicle electric storage device according to the 6th aspect may be a metal plate having provided an insulating material on one surface thereof that faces an inside of the cabinet, a metal plate having provided an insulating material on each side thereof, or a metal plate having no insulating material on each side thereof.

According to the 8th aspect of the present invention, it is preferred that in an in-vehicle electric storage device according to the 6th aspect, a protrusion surrounding the opening is provided on the bottom side of the bottom plate, the blocking plate is provided at a stepped portion surrounded by the protrusion, and assuming that a thickness of the blocking plate is S5, and a protrusion height of the protrusion is S6, S5 and S6 satisfy a relationship of: $S5 \leq S6$.

According to the 9th aspect of the present invention, it is preferred that in an in-vehicle electric storage device according to the 6th aspect, a protrusion surrounding the opening is provided on a bottom side of the bottom plate, the blocking plate is provided at a stepped portion surrounded by the protrusion, and assuming that a thickness of the blocking plate is S5, a protrusion height of the protrusion is S6, and a distance between the protrusion and the top side of the casing of the battery block is S7, S5, S6 and S7 satisfy a relationship of: $S6<S5<(S6+S7)$.

According to the 10th aspect of the present invention, it is preferred that in an in-vehicle electric storage device according to the 1st aspect, a plurality of bosses that protrude outward is provided on a side surface of the case, the cover is provided with a plurality of bosses that protrude laterally along each boss of the case, a top side of each of the plurality of bosses of the cover protrudes by a difference in level S8 lower than a top side of the cover, the bosses of the case and the bosses of the cover are fastened with screws, each of the screws contains a top surface area that protrudes upward from the top side of the bosses of the case by a height S9, and S8 and S9 satisfy a relationship of: $S9<S8$.

According to the present invention, an electric storage device including a control unit and battery modules can be reduced in size.

BRIEF DESCRIPTION OF THE DRAWINGS

FIG. 2 presents a diagram showing IC1 to IC3 for battery block 100a in FIG. 1;

FIG. 14A presents a diagram showing a relationship between the position of a circuit board and a lead in the cabinet of the monitor unit and FIG. 14B is a diagram showing a part of FIG. 14A in an enlarged scale;

DESCRIPTION OF PREFERRED EMBODIMENTS

Figure 1:
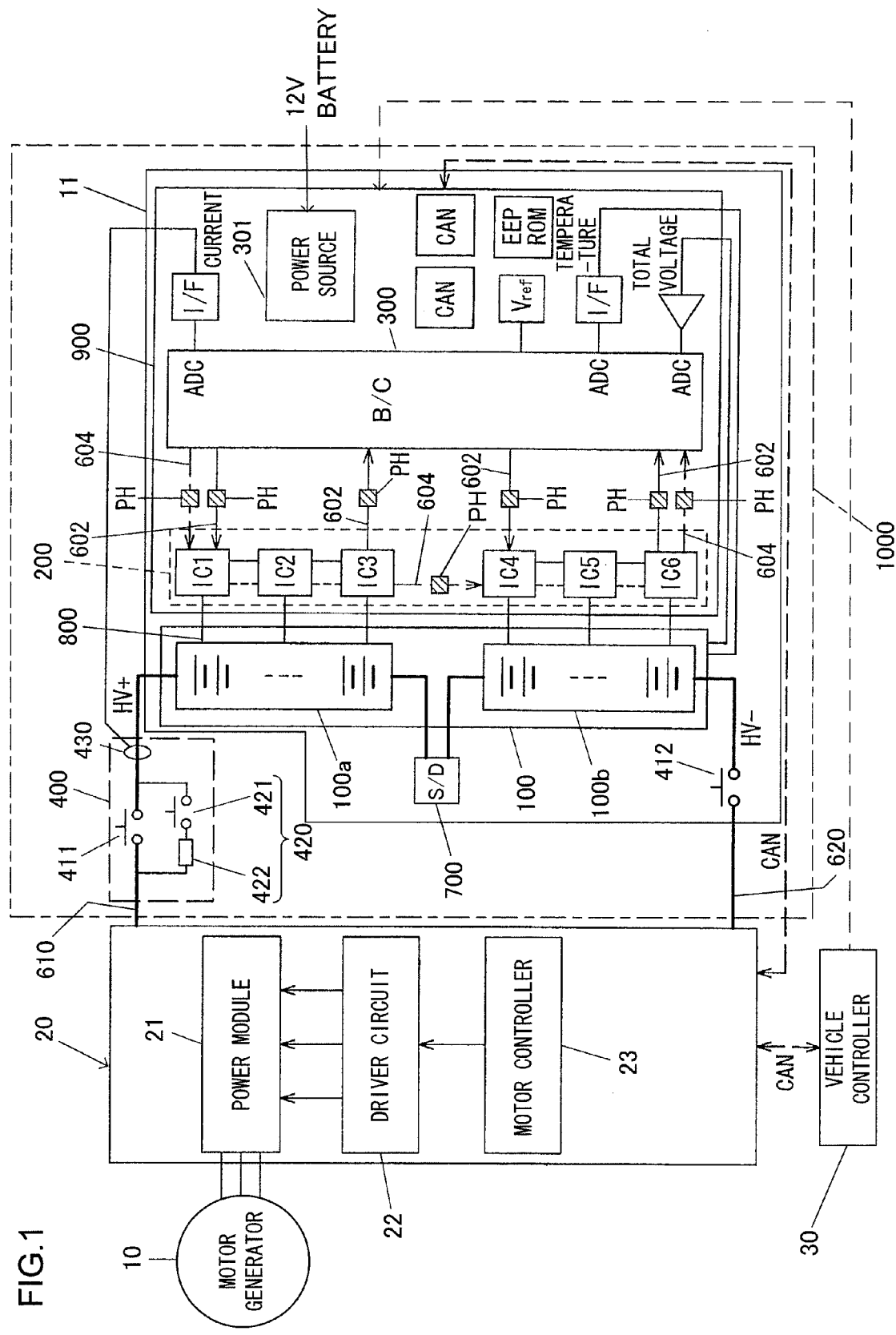
FIG. 1 presents a block diagram showing the configuration of an in-vehicle motor system including an electrical storage device according to one embodiment of the present invention.

Hereafter, an electric storage device according to an embodiment of the present invention is explained with reference to the attached drawings.

Embodiment

The above described embodiments are exemplary and various modifications can be made without departing from the scope of the invention. Electric automobiles include a hybrid electric automobile provided with both an engine, which is an internal combustion engine, and a motor as drive sources and a genuine electric automobile provided with a motor as only one drive source, and so on.

Hereinafter, explanation will be made assuming the following. That is, an electric storage device includes a battery module and a control unit and a battery module includes a plurality of battery blocks. Further, The plurality of battery blocks are each constituted by an assembled battery having a plurality of battery cells connected to each other and accommodated in a casing.

The configuration of an in-vehicle electric system (motor drive system) inclusive of the electric storage device according to the present embodiment is explained with reference to FIG. 1.

—In-Vehicle Electric System—

An in-vehicle electric system includes a motor generator 10, an inverter 20, a vehicle controller 30 that controls the vehicle in whole, and an electric storage device 1000 that constitutes an in-vehicle power supply. The electric storage device 1000 includes a plurality of storage batteries and is designed, for example, as a lithium ion battery device equipped with a plurality of lithium ion battery cells.

(Motor Generator)

A motor generator 10 is a machine that is synchronized with three-phase alternating current. The motor generator 10 drives the motor in an operation mode in which rotational motive power is required, for example, when the vehicle is power running or when the engine, which is an internal combustion engine, is started, and supplies the generated rotational motive power to driven components such as the wheels and the engine. In this case, the in-vehicle electric system converts direct current from the lithium ion battery 1000 into three-phase alternating current through the inverter 20 as an electric power converter and supplies the obtained three-phase alternating current to the motor generator 10.

In an operation mode in which generation of electricity is required, for example, at the time of regeneration such as slowing down (deceleration) or braking the vehicle, or when charging of the lithium ion battery unit 1000 is necessary, the motor generator 10 is driven by driving force from the wheels or engine to serve as a generator to generate three-phase alternating current. In this case, the in-vehicle electric system converts the three-phase alternating current from the motor generator 10 into direct current through the inverter 20 and supplies the direct current to the lithium ion battery unit 1000. As a result, electric power is accumulated in the lithium ion battery 1000.

(Inverter 20)

The inverter 20 is an electronic circuit unit that controls the above-mentioned electric power conversion, that is, conversion from direct current power to three-phase alternating current power and three-phase alternating current power to direct current power by operation (on/off) of switching semiconductors. The inverter 20 includes a power module 21, a driver circuit 22, and a motor controller 23.

The power module 21 is a power conversion circuit that includes six (6) switching semiconductors and performs the above-mentioned electric power conversion by switching operation (on/off) of the switching semiconductors. The switching semiconductors that can be used include, for example, a metal oxide semiconductor field effect transistor (MOSFET) or an insulated gate bipolar transistor (IGBT). When the power module 21 is constituted by a MOSFET, a parasitic diode is electrically connected between the drain electrode and the source electrode in inverse-parallel connection. On the other hand, when the power module 21 is constituted by an IGBT, it is necessary that separately a diode shall be electrically connected between the collector electrode and the emitter electrode in inverse-parallel connection.

The power module 21 is constituted by a three-phase bridge circuit that includes three series circuits for three-phases, respectively, electrically connected in parallel. Each series circuit (arm for one phase) includes two switching semiconductors (upper arm switching semiconductor and lower arm switching semiconductor) that are electrically connected to each other in series.

The power module 21 is provided with a direct current positive electrode side module terminal (not shown) and a direct current negative electrode side module terminal (not shown). On a side of each upper arm opposite to a side where each upper arm is connected to the lower arm is electrically connected to a direct current positive electrode side module terminal. On the other hand, on a side of each lower arm opposite to a side where each lower arm is connected to the upper arm is electrically connected to a direct current negative electrode side module terminal. The direct current positive side module terminal and the direct current negative electrode side module terminal are electrically connected to a direct current positive electrode side external terminal and a direct current negative electrode side external terminal, respectively. The direct current positive electrode side external terminal and the direct current negative electrode side external terminal are power source side terminals that supply/receive direct current power between the inverter 20 and the lithium ion battery 1000. To these external terminals are electrically connected a positive electrode side power source cable 610 and a negative electrode side power source cable 620, each extending from the lithium ion battery 1000.

The power module 21 is provided with an alternating current side module terminal. The alternating current side module terminal is electrically connected to an alternating current side external terminal. The alternating current side external terminal is a load side terminal that supplies/receives three-phase alternating current between the power module 21 and the motor generator 10 and that is electrically connected to a load cable that extends from the motor generator 10.

(Motor Controller 23)

A motor controller 23 is an electronic circuit that controls the switching operations of the six (6) switching semiconductor devices constituting the power module 21. The motor controller 23 generates switching operation command signals (for example, PWM (pulse width modulation) signals for the six switching semiconductors devices based on a torque command output from an upper level control unit, for example, a vehicle controller 30 that controls the vehicle in whole. The generated command signals are output to a driver circuit 22.

The driver circuit 22 generates drive signals for the six (6) switching semiconductor devices based on the switching operation command signals output from the motor controller 23. The drive signals are output to the respective gate electrodes of the six switching semiconductor devices that constitute the power module 21. With this configuration, the six switching semiconductor devices that constitute the power module 21 controls the switching (on/off) based on the drive signals output from the driver circuit 22.

The electric storage device, that is, the lithium ion battery 1000 includes a battery module 100 for accumulating and discharging electric energy (charging and discharging direct current power) and a control unit 900 for managing and controlling the state of the battery module 100.

The battery module 100 are constituted by two battery blocks (or battery packs), that is, a higher potential side battery block 100a and a lower potential side battery block 100b electrically connected in series.

(Battery Blocks 100a, 100b)

Figure 7:
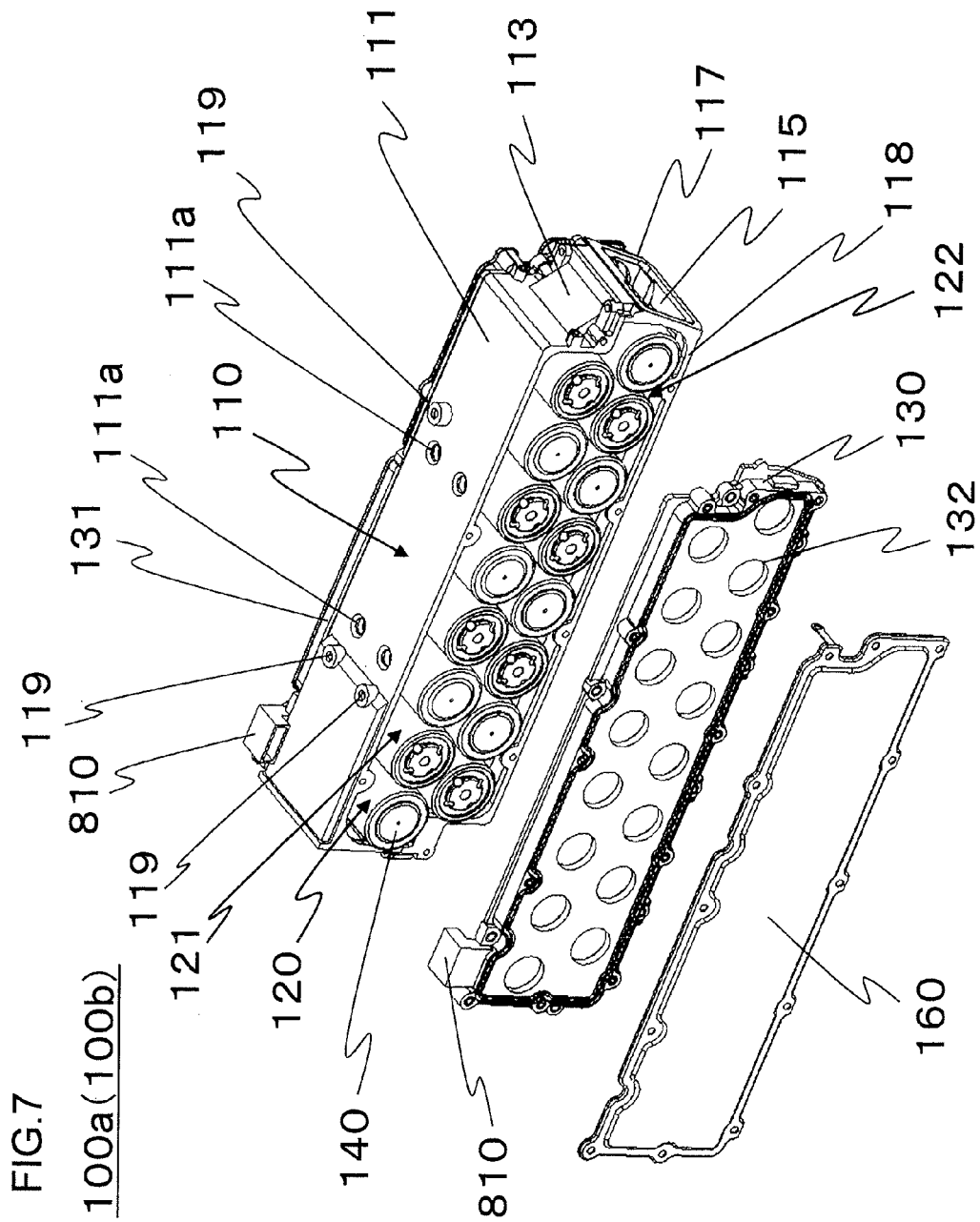
FIG. 7 presents an exploded perspective view showing the battery block shown in FIG. 6.

As shown in FIG. 7, each of the battery blocks 100a and 100b is provided with a casing 110 made of a metal and an assembled battery 120 accommodated in the casing 110. Each assembled battery 120 is a connection work that is obtained by connecting a plurality of the lithium ion battery cells 140 electrically in series. Configuration of each battery block will be described later.

As shown in FIG. 1, an SD (service/disconnect) switch 700 is provided between a negative electrode side (lower potential side) of the higher potential side battery block 100a and a positive electrode side (higher potential side) of the lower potential side battery block 100b. The SD switch 700 is a safety unit provided in order to secure safety at the time of maintenance and checkup of the lithium ion battery 1000. The SD switch 700 is constituted by an electric circuit that includes a switch and a fuse connected to each other electrically in series.

(Control Unit 900)

The control unit 900 is constituted by a battery controller 300, which is of a higher level (parent), and a cell controller 200, which is of a lower level (child).

The battery controller 300 is fed with power from a power source circuit 301 and manages and controls the state of the lithium ion battery 1000. Also, the battery controller 300 notifies the vehicle controller 30 and the motor controller 23, which are upper level control units, of charge discharge control commands such as the state of the lithium ion battery 1000 and allowable charge discharge power. The power source circuit 301 drops the voltage fed from a 12V battery for accessories to a low voltage of about 5 V.

Management and control of the lithium ion battery 1000 covers measurement of voltage and current of the lithium ion battery 1000, calculation of state of charge (SOC) and state of health (SOH) of the lithium ion battery 1000, measurement of temperature of each battery block, output of commands to the cell controller 200 including, for example, a command to measure voltage of each lithium ion battery cell, and a command to adjust an amount of stored electricity and so on.

The cell controller 200 manages and controls the state of a plurality of lithium ion battery cells 140 based on the command from the battery controller 300. The cell controller 200 is constituted by a plurality of integrated circuits (ICs). The manage and control of the plurality of lithium ion battery cells 140 cover measurement of voltage of each lithium ion battery cell 140, adjustment of the amount of stored electricity of each lithium ion battery cell 140, and so on. To each integrated circuit is allocated a corresponding group of a plurality of lithium ion battery cells 140 and manages and controls the state of the corresponding group of the plurality of lithium ion battery cells 140.

As the power source of the integrated circuits that constitute the cell controller 200, the corresponding group of the plurality of lithium ion battery cell 40 is used. Accordingly, the cell controller 200 and the battery module 100 are electrically connected to each other through a connection line 800 (cf., FIGS. 1 to 5). To each integrated circuit is applied a voltage of the highest potential among the corresponding group of the lithium ion battery cells 140 through the connection line 800.

The control unit 900 performs in the main measurement of voltage of each cell, measurement of total voltage, measurement of current, adjustment of cell temperature and cell capacity, and so on. For this purpose, a cell controller having IC (integrated circuit) 1 to IC 6 is provided. Sixteen (16) battery cells provided in each battery block 100a or 100b are divided into three (3) cell groups and an integrated circuit is provided for each cell group.

IC 1 to IC 6 include each a communication system 602 and a 1-bit communication system 604. The communication system 602, which is dedicated for reading cell voltage values and transmitting various commands, performs serial communication with the battery controller 300 in a daisy chain mode through an insulated device (for example, a photocoupler) PH. The 1-bit communication system 604 transmits abnormality signal when overcharge of a cell is detected. In the example shown in FIG. 1, the communication system 602 is divided into two communication channels, i.e., an upper level communication channel for IC1 to IC3 in the battery block 100a and a lower level communication channel for IC4 to IC6 in the battery block 100b.

Each IC performs abnormality diagnosis and transmits an abnormality signal from its transmitting terminal FFO when the IC of interest determines that abnormality occurs or when it receives an abnormality signal with its receiving terminal FFI from an anterior IC. On the other hand, in case where the abnormality signal that has already been being received with the receiving terminal FFI is discontinued or in case where the abnormality judgment made by the IC of interest is changed to normality judgment, the abnormality signal that has been being transmitted from the transmitting terminal FFO is discontinued. The abnormality signal used in the present embodiment is 1-bit signal.

The battery controller 300 does not transmit any abnormality signal to the ICs. However, to diagnose whether the 1-bit communication system 604, which is a transmission channel for abnormality signals operates well, the battery controller 300 sends a test signal, which is a pseudo abnormality signal, to the 1-bit communication system 604. The IC1 that received the test signal sends a pseudo abnormality signal to the abnormality communication system 604 and this abnormality signal is received by IC2. The abnormality signal is transmitted from IC2 to IC3, IC4, IC5, and IC6 in this order and finally returned to the battery controller 300 by IC6. When the communication system 604 operates normally, the pseudo abnormality signal transmitted by the battery controller 300 is returned to the battery controller 300 through the communication system 604. By transmitting and receiving a pseudo abnormality signal by the battery controller 300 in the above-mentioned manner, diagnosis of the communication system 604 becomes possible so that the reliability of the system is improved.

In a battery disconnection unit 400 is arranged a current sensor 430 such as a Hall element and the output of the current sensor 430 is input to the battery controller 300. Signals relating to the total voltage and temperature of the battery module 100 are input to the battery controller 300 and each measured by AD converter (ADC) of the battery controller 300. The temperature sensor is provided at a plurality of sites in the battery blocks 100a and 100b.

FIG. 2 presents a diagram showing a part of IC1 to IC3 relating to the battery block 100a shown in FIG. 1. Although explanation is omitted, the battery block 100b has a similar configuration to that of the battery block 100a. The sixteen battery cells provided in the battery block 100a are divided into three cell groups, i.e., four (4) cells, six (6) cells, and six (6) cells. For these cell groups, IC1, IC2, and IC3 are provided, respectively.

CV1 to CV6 terminals of IC1 are terminals dedicated to measure cell voltage of the battery cells. Each IC can perform measurement of up to six (6) cells. In case of IC2 and IC3 that monitor each six cells, a resistor RCV for limiting discharge current in order to protect terminals and adjust capacity is provided to the voltage measurement line of CV1 to CV6 terminals. On the other hand, in case of CV1 that monitors four (4) cells, a resistor RCV for limiting discharge current in order to protect terminals and adjust capacity is provided to the voltage measurement line of CV3 to CV6 terminals. Each voltage measurement line is connected to the positive electrode or the negative electrode of each battery cell BC through a sensing line 800. The negative electrode of the battery cell BC6 is connected to respective GNDS terminals of IC2 and IC3. For example, when the cell voltage of the battery cell BC1 is to be measured, a voltage between CV1-CV2 terminals is measured. When the cell voltage of the battery cell BC6 is to be measured, a voltage between CV6-GNDS terminals is measured. In case of IC1, cell voltages of the battery cells BC1 to BC4 are measured by using the CV3 to CV6 terminals and the GNDS terminal. Between the voltage measurement lines, there are provided capacitors Cv and Cin as countermeasures for preventing noises.

To fully utilize the performance of the battery module 100, it is necessary to equalize the cell voltages of thirty two (32) cells. For example, when there is observed a wide fluctuation in cell voltage, it is necessary that regeneration operation be stopped at a time when the battery cell that shows the highest voltage upon regenerative charging reaches an upper limit voltage. In this case, although the voltages of the other battery cells have not yet reached the upper limit, the regeneration operation is stopped and energy is consumed by the motor generator working as a brake. To prevent this phenomenon, each IC performs discharging for adjusting the capacity of the battery cell in response to a command from the battery controller 300.

As shown in FIG. 2, each of IC1 to IC3 is provided with balancing switches BS1 to BS6 for adjusting the cell capacity between terminals CV1-BR1, BR2-CV3, CV3-BR3, BR4-CV5, CV5-BR5, and BR6-GNGS, respectively. For example, in order to perform discharging of the battery cell BC1 of IC1, the balancing switch BS3 is turned on. Then, balancing current flows in a route of the positive electrode of the battery cell CV1→resistor RCV→CV3 terminal→balancing switch BS3→BR3 terminal→resistor RB→the negative electrode of the battery cell CV1. RB or RBB is a resistor for balancing.

Between IC1 to IC3 are provided the communication systems 602 and 604. A communication command from the battery controller 300 is input to the communication system 602 through a photocoupler PH and received by a receiving terminal LIN1 of IC 1 through the communication system 602. From a transmission terminal LIN2 of IC1 is transmitted data or command in response to the communication command. The communication command received by the receiving terminal LIN1 of IC2 is transmitted from a transmission terminal LIN2 of a transmission terminal LIN2 of IC2. Transmission and receipt are performed in order in the above-mentioned manner and a transmission signal is transmitted from a transmission terminal LIN2 of IC3 and received by the receiving terminal of the battery controller 300 through a photocoupler PH. IC1 to IC3 performs transmission of measured data such as cell voltage to the battery controller 300 and balancing operation. Each of IC 1 to IC3 detects overcharging of a cell based on the measured cell voltages. The result of detection (abnormality signal) is transmitted to the battery controller 300 through the signal system 604.

Figure 3:
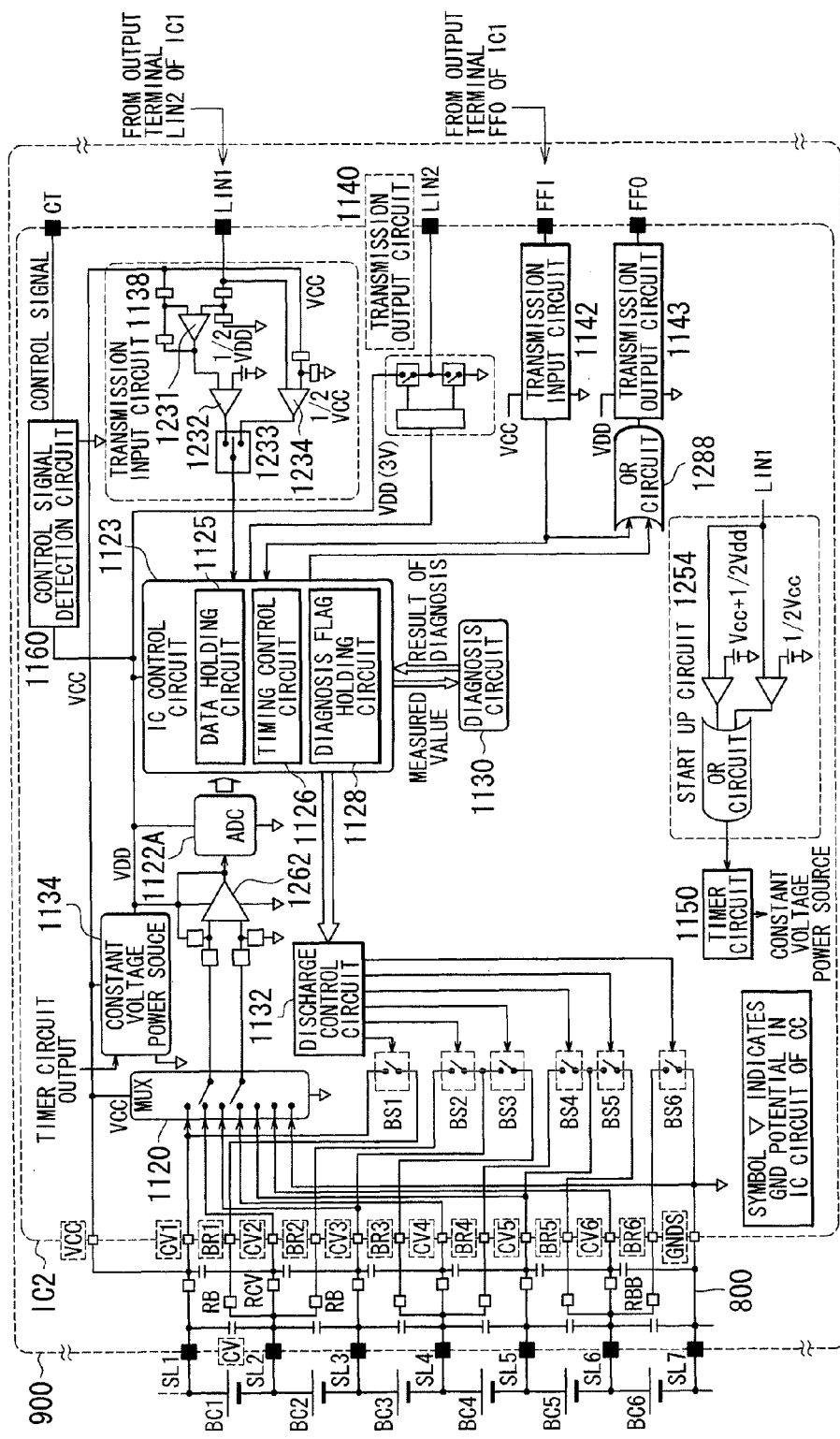
FIG. 3 presents an explanatory diagram illustrating the internal configuration of the IC shown in FIG. 2.

FIG. 3 presents a schematic diagram showing IC internal blocks taking as an example IC2 having connected six battery cells BC1 to BC6. Although explanation is omitted, other ICs have similar configurations. IC2 is provided with a multiplexer 1120 as a battery state detection circuit, an analog-digital converter 1122A, an IC control circuit 1123, a diagnosis circuit 1130, transmission input circuits 1138 and 1142, transmission output circuit 1140 and 1143, an activation circuit 1254, a timer circuit 1150, a control signal detection circuit 1160, a differential amplifier 1262, and an OR circuit 1288.

Terminal voltages of the battery cells BC1 to BC6 are input to the multiplexer 1120 through the terminals CV1 to CV6 and GNDS. The multiplexer 1120 selects any one of the terminals CV1 to CV6 and GNDS and inputs therethrough a voltage between the terminals to the differential amplifier 1262. An output of the differential amplifier 1262 is converted into a digital value by the analog-digital converter 1122A. The voltage between terminals converted into a digital value is sent to the IC control circuit 1123 and stored in a data storage circuit 1125 therein. The voltage between terminals of each of the battery cells BC1 to BC6 input to the terminals CV1 to CV6 and GNDS is biased by a potential based on the voltage between terminals of the battery cell connected in series to the ground potential of IC2. The influence of the bias potential is removed by the differential amplifier 1262 and an analog value based on the voltage between terminals of each of the battery cells BC1 to BC4 is input to the analog-digital converter 1122A.

The IC control circuit 1123 has a function of calculation and includes a data holding circuit 1125, a timing control circuit 1126 that performs voltage measurement and state diagnosis periodically, and a diagnosis flag holding circuit 1128 in which a diagnosis flag from the diagnosis circuit 1130 is set. The IC control circuit 1123 decodes the content of the communication command that is input from the transmission input circuit 1138 and performs processing in response to the contents of the communication command. Such commands include, for example, a command to request a measured value of inter-terminal voltage of each battery cell, a command to request discharge operation for adjusting charge state of each battery cell, a command to start the operation of the IC (Wake UP), a command to stop the operation (Sleep), and a command to request setting of address.

The diagnosis circuit 1130 performs various diagnoses, for example overcharge diagnosis and over discharge diagnosis based on the measured value from the IC control circuit 1123. The holding circuit 1125, which is constituted, for example, by a resistor circuit, stores the detected inter-terminal voltage of each of the battery cells BC1 to BC6 in relation to the battery cells BC1 to BC6 and retrievably holds other detected values at predetermined addresses.

At least two types of power source voltages VCC and VDD are used for internal circuits of IC2. In the example shown in FIG. 3, the voltage VCC is a total voltage of the battery cell group constituted by the battery cells BC1 to BC6 connected in series whereas the voltage VDD is generated by the constant voltage power source 1134. The multiplexer 1120 and the transmission input circuits 1138 and 1142 for signal transmission operate at the high voltage VCC. The analog-digital converter 1122A, the IC control circuit 1123, the diagnosis circuit 1130, the transmission output circuits 1140 and 1143 for signal transmission operate at the low voltage VDD.

The signal received by the receiving terminal LIN1 of IC2 is input to the transmission input circuit 1138 and the signal received by the receiving terminal FFI is input to the transmission input circuit 1142. The transmission input circuit 1142 has a configuration similar to that of the transmission input circuit 1138.

The transmission input circuit 1138 is configured to output a signal from the circuit 1232 by a switch 1233, which will be explained later, when a signal from any other IC that is adjacent to the receiving terminal LIN1 is input to the transmission input circuit 1138. The transmission input circuit 1138 is configured to output the signal from the circuit 1234 by the switch 1233, which will be explained in detail, when a signal from the photocoupler PH is input to the receiving terminal LIN1.

As shown in FIG. 2, in case of the top level IC1, a signal from the photocoupler PH is input to the receiving terminal LIN1. In case of other IC2 and IC3, a signal from adjacent IC is input to the receiving terminal LIN1. With this configuration, which one of the circuit 1232 and the circuit 1234 is used is selected by the switch 1233 based on the control signal applied to the control terminal CT as shown in FIG. 3. The control signal applied to the control terminal CT is input to the control signal detection circuit 1160 and the switch 1233 performs switching operation based on the command from the control signal detection circuit 1160.

Therefore, in case of the top IC in the direction of transmission of IC, that is, when a signal from the upper level controller (battery controller 300) is input to the receiving terminal LIN1 of IC through the photocoupler PH, a lower contact of the switch 1233 is closed and an output signal from the circuit 1234 is output from the transmission input circuit 1138. On the other hand, when a signal from adjacent IC is input to the receiving terminal LIN1 of IC, the upper contact of the switch 1233 is closed and an output signal from the circuit 1232 is output from the transmission input circuit 1138. In case of IC2 shown in FIG. 3, the signal from adjacent IC1 is input to the transmission input circuit 1138, so that the upper contact of the switch 1233 is closed. The output from the upper level controller (battery controller 300) and the output from the adjacent transmission terminal LIN2 have different wave height values of output waveforms, so that thresholds for determination are different from each other. For this reason, the switch 1233 for the circuit 1138 is switched based on the control signal of the control terminal CT. The communication system 604 has similar configuration to that of the communication system 602.

The communication command received by the receiving terminal FF1 is input to the IC control circuit 1123 through the transmission input circuit 1142. The IC control circuit 1123 outputs data or command in response to the received communication command to the transmission output circuit 1140. The data and command are transmitted from the transmission terminal LIN2 through the transmission output circuit 1140. The transmission output circuit 1143 has a configuration similar to that of the transmission output circuit 1140.

The signal received from the terminal FFI is used for transmitting an abnormal state (overcharge) signal. When a signal indicating abnormality is received from the terminal FFI, the signal is input the transmission output circuit 1143 through the transmission input circuit 1142 and an OR circuit 1288 and is output from the transmission output circuit 1143 through the terminal FFO. When abnormality is detected by the diagnosis circuit 1130, a signal that indicates abnormality is input to the transmission output circuit 1143 from the diagnosis flag holding circuit 1128 through the OR circuit 1288 regardless of what has been received by the terminal FFI and that signal is output from the transmission output circuit 1143 through the terminal FFO.

When a signal transmitted from the adjacent IC or the photocoupler PH is received by a startup circuit 1254, a timer circuit 1150 operates to supply voltage VCC to the constant voltage power source 1134. With this operation, the constant voltage power source 1134 becomes active to output constant voltage VDD. When the constant voltage VDD is output from the constant voltage power source 1134, IC2 wakes up from a sleep state into an active state.

As mentioned above, balancing switches BS1 to BS6 for adjusting charge amount of the battery cells BC1 to BC6, respectively, are provided inside the IC. According to the present embodiment, PMOS switches are used for the balancing switches BS1, BS3, and BS5 and NMOS switches are used for balancing switches BS2, BS4, and BS6.

Opening and closing (switching) of the balancing switches BS1 to BS6 is controlled by the discharge control circuit 1132. A command signal that causes a balancing switch corresponding to a battery cell to be discharged is sent from the IC control circuit 1123 to the discharge control circuit 1132 based on a command from the battery controller 300. The IC control circuit 1123 receives by communication a command on discharge time corresponding to each of the battery cells BC1 to BC6 from the battery controller 300 and performs the above-mentioned discharge operation.

As shown in FIG. 1, the positive electrode terminal of the higher potential side battery block 100a and the direct current positive electrode side external terminal of the inverter 20 are electrically connected to each other through the positive electrode side power source cable 610. The negative electrode terminal of the lower potential side battery block 100b and the direct current negative electrode side external terminal of the inverter 20 are electrically connected to each other through the negative electrode side power source cable 620.

In mid-stream of the power source cables 610 and 620 are provided a junction box 400 and a negative electrode side main relay 412. Inside the junction box 400 is accommodated a relay mechanism that is constituted by a positive electrode side main relay 411 and a precharge circuit 420. The relay mechanism is a switching unit that electrically connects and disconnects between the batter module 100 and the inverter 20. The relay mechanism electrically connects between the battery module 100 and the inverter 20 when the in-vehicle electric system is started up and electrically disconnects between the battery module 100 and the inverter 20 when the in-vehicle electric system is halting and in an abnormal state. As mentioned above, by controlling continuity and discontinuity between the lithium ion battery 1000 and the inverter 20, high safety of the in-vehicle electric system can be secured.

The relay mechanism is driven and controlled by the motor controller 23. The motor controller 23, when the in-vehicle electric system is started up, receives a notice that startup of the lithium ion battery 1000 has been completed from the battery controller 300 and based on this notice outputs a command signal to make the relay mechanism conductive to drive the relay mechanism. The motor controller 23, when the in-vehicle electric system is halted, receives an output signal "off" from an ignition key switch and based on this signal outputs a command signal to disconnect to the relay mechanism to drive the relay mechanism. When the in-vehicle electric system is abnormal, the motor controller 23 receives an abnormality signal from the vehicle controller and based on this abnormality signal outputs a command signal to discontinue the relay mechanism to drive the relay mechanism.

The positive electrode side main relay 411 is provided in mid-stream of the positive electrode side power source cable 610 and controls electric connection between the positive electrode side of the lithium ion battery 1000 and the positive electrode side of the inverter 20. The negative electrode side main relay 412 is provided in mid-stream of the negative electrode side power source cable 620 and controls electric connection between the negative electrode side of the lithium ion battery 1000 and the negative electrode side of the inverter 20.

The precharge circuit 420 is a series circuit that includes a precharge relay 421 and a resistor 422 electrically connected to each other in series and is electrically connected to the positive electrode side main relay 411 in parallel.

Upon starting up the in-vehicle electric system, first the negative electrode side main relay 412 is turned on and then the precharge relay 421 is turned on. With this operation, current supplied from the lithium ion battery 1000 is controlled by the resistor 422 and then supplied to a smoothing capacitor mounted on the inverter to charge the smoothing capacitor. After the smoothing capacitor is charged up to a predetermined voltage, the positive electrode side main relay 411 is turned on to open the precharge relay 421. With this operation, main current is supplied from the lithium ion battery 1000 to the inverter 20 through the positive electrode side main relay 411.

Inside the junction box 400 is accommodated a current sensor 430. The current sensor 430 is provided in order to detect current supplied from the lithium ion battery 1000 to the inverter 20. The output line of the current sensor 430 is electrically connected to the battery controller 300. The battery controller 300 detects current supplied from the lithium ion battery 1000 to the inverter 20 based on a signal output from the current sensor 430. The current detection information is notified from the battery controller 300 to the motor controller 23, the vehicle controller 30, and so on.

The current sensor 430 may be set outside the junction box 400. The site at which current of the lithium ion battery 1000 is detected is not limited to the inverter 20 side of the positive electrode side main relay 411 but may be on the battery module 100 side of the positive electrode side main relay 411.

Inside the junction box 400, a voltage sensor for detecting the voltage of the lithium ion battery 1000 may be accommodated. The battery controller 300 detects a total voltage of the lithium ion battery 1000 based on an output signal of the voltage sensor. The voltage detection information is notified to the motor controller 23 and the vehicle controller 30. The site at which voltage of the lithium ion battery 1000 is detected may be either on the battery module 100 side or on the inverter 20 side of the relay mechanism.

—Lithium Ion Battery Unit—

Now, the configuration of the lithium ion battery 1000 is explained with reference to FIGS. 4 to 7.

The lithium ion battery 1000 centers on two units, i.e., the battery module 100 and the control unit 900.

(Battery Module)

Hereafter, the configuration of the battery module 100 is explained.

As mentioned above, the battery module 100 includes the higher potential side battery block 100a and the lower potential side battery block 100b. The two battery blocks 100a and 100b are electrically connected to each other in series. It should be noted that the higher potential side battery block 100a and the lower potential side battery block 100b have quite the same configuration.

Figure 6:
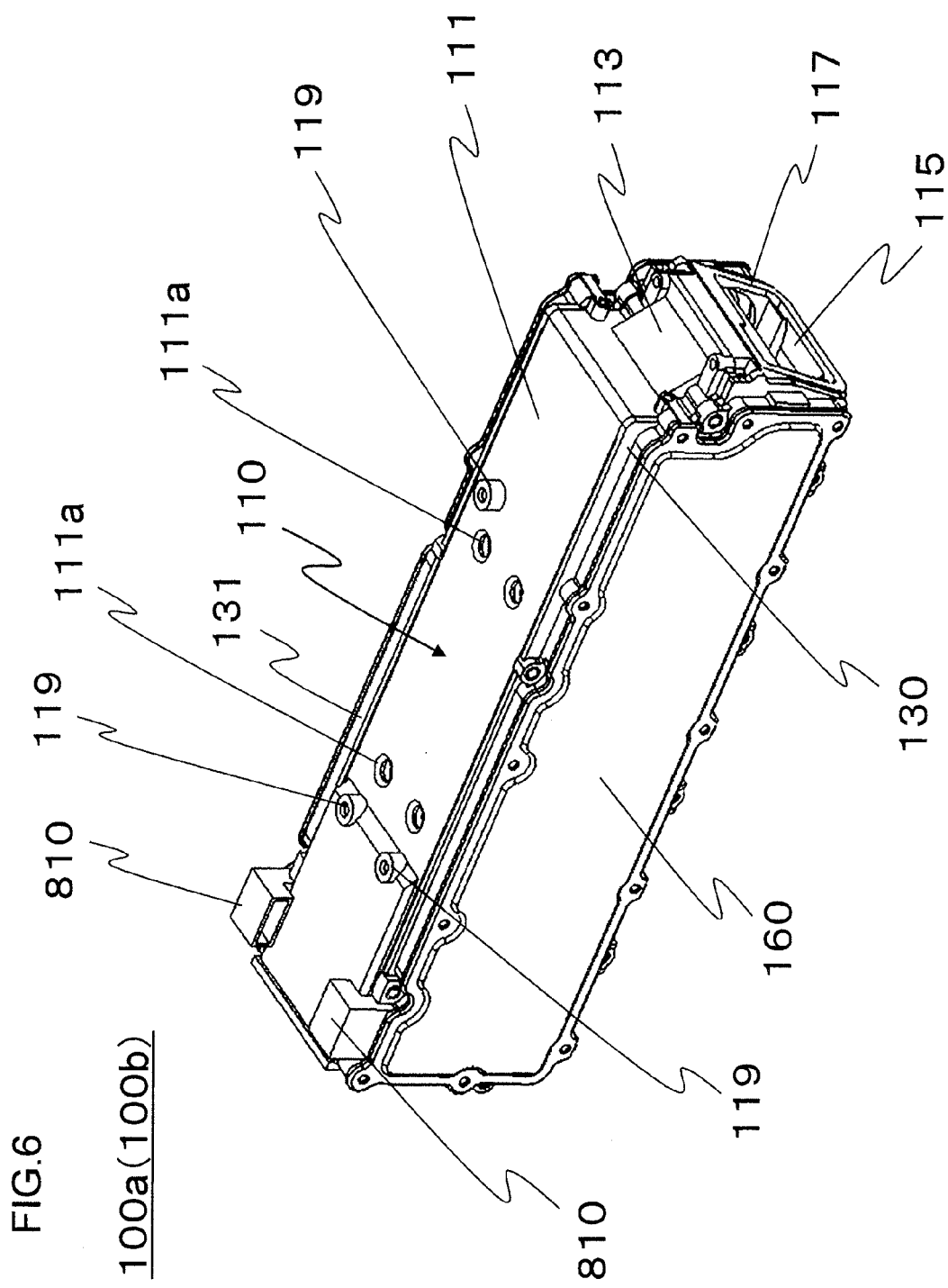
FIG. 6 presents a perspective view showing an appearance configuration of a single battery block in the electric storage device shown in FIG. 4.

For this reason, in FIGS. 6 and 7, only the higher potential side battery block 100a is shown as a representative and description of detailed configuration of the lower potential side battery block 100b is omitted.

Figure 4:
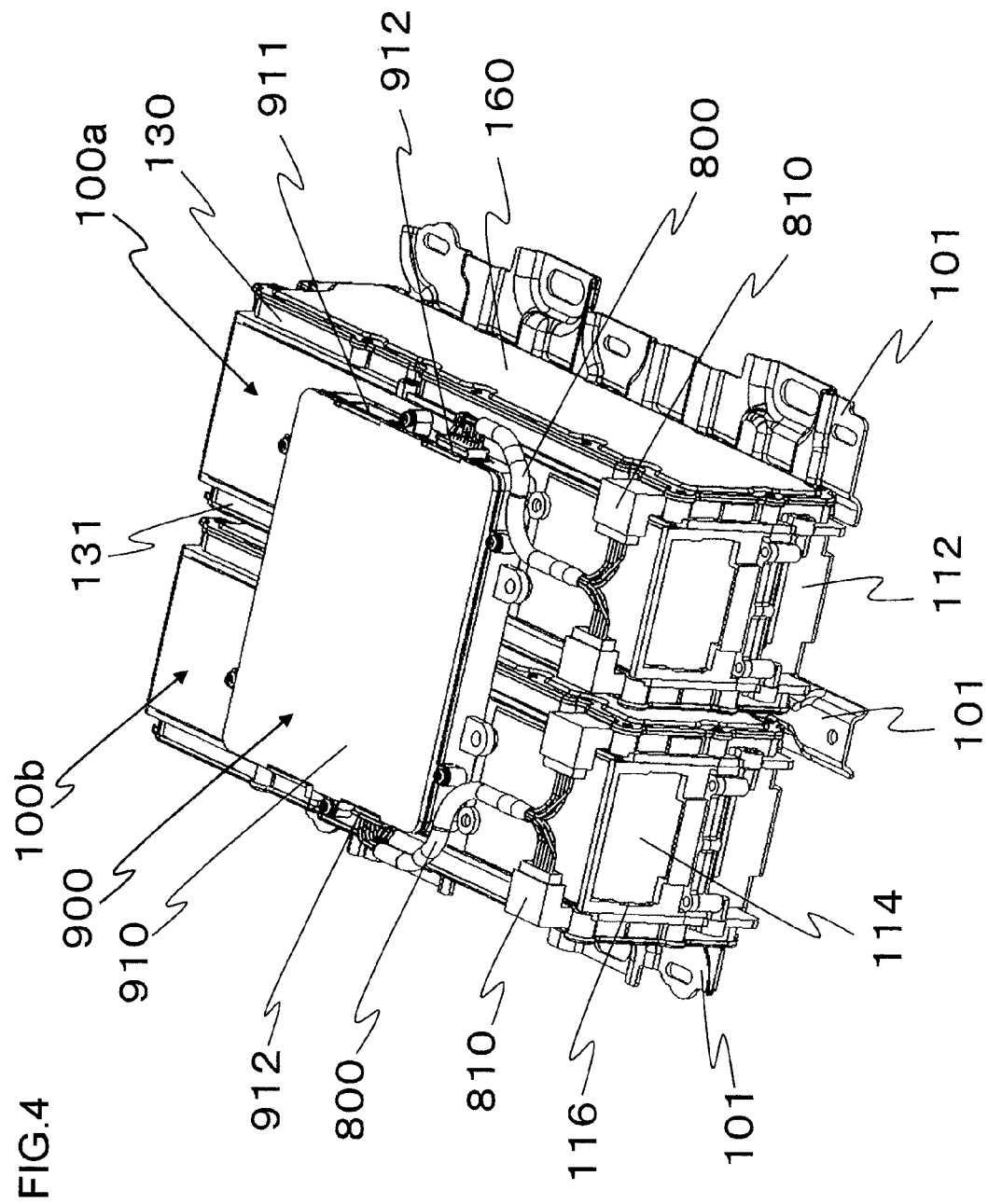
FIG. 4 presents a perspective view giving an overview of the electrical storage device shown in FIG. 1.
Figure 5:
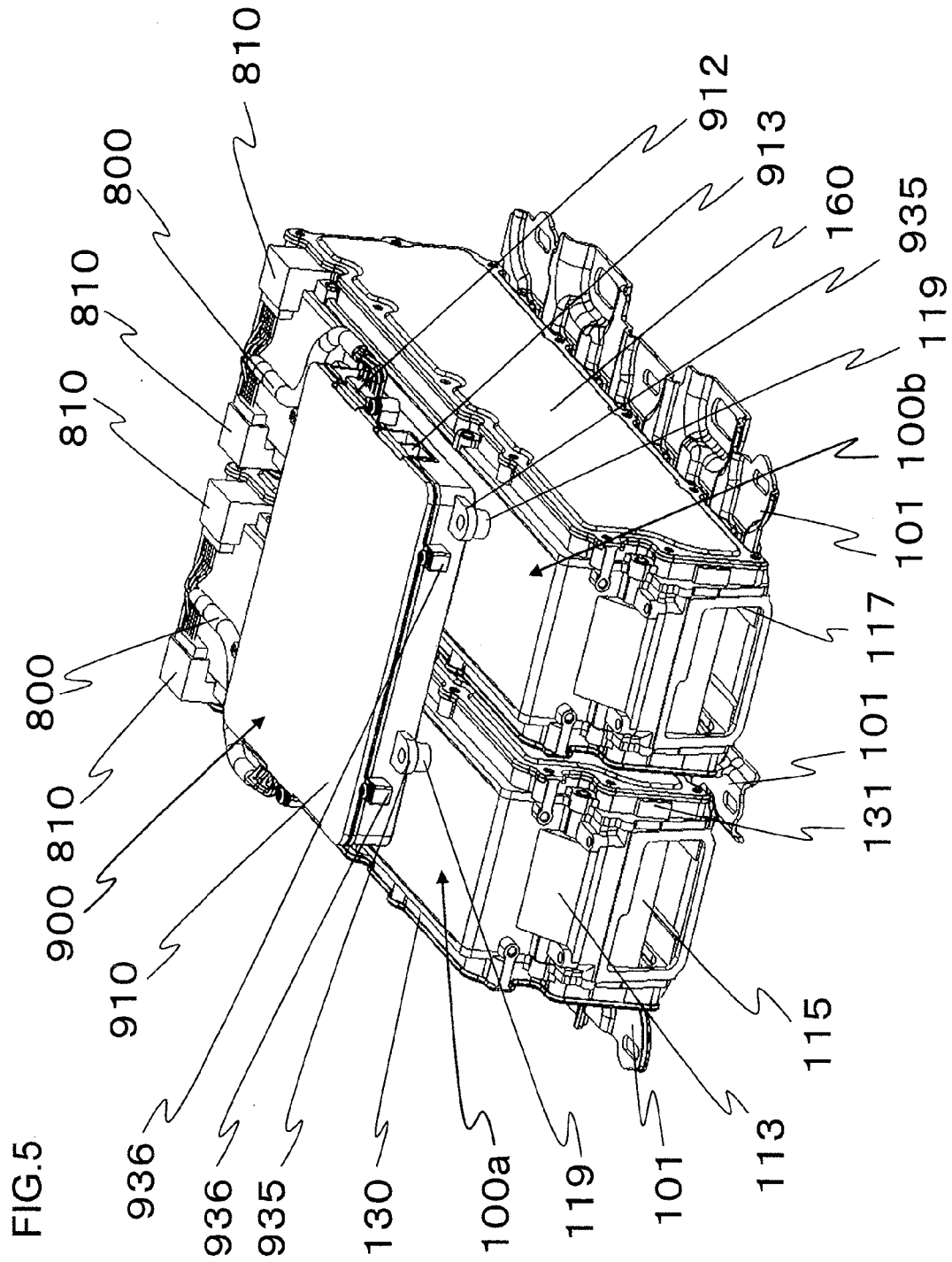
FIG. 5 presents a perspective view of the electrical storage device shown in FIG. 4 as seen from the side of a coolant outlet.

As shown in FIGS. 4 and 5, the higher potential side battery block 100a and the lower potential side battery block 100b are arranged adjacent to each other in juxtaposition so that their longitudinal directions are parallel to each other. The higher potential side battery block 100a and the lower potential side battery block 100b are arranged on a module base 101 in juxtaposition and fixed to the module base 101 by fixing means such as bolts. The module base 101 is constituted by thin metal plate (or example, iron plate) divided into three parts in the direction of a shorter side and fixed to the vehicle. That is, the module base 101 includes three members, i.e., both ends in the direction of a shorter side and a central member.

With this configuration, a surface of the module base 101 can be made flush with a lower surface of each of the battery blocks 100a and 100b, which contributes size reduction of the battery module 100 in the height direction.

Upper portions of the higher potential side battery block 100a and the lower potential side battery block 100b are fixed to the cabinet 910 of the control unit 900 which will be explained later.

As shown in FIGS. 4 to 7, especially FIG. 7, two major components of the higher potential side battery block 100a are a casing 110 (also sometimes referred to as "cabinet", "housing" or "package") and an assembled battery 120. The assembled battery 120 is held by being accommodated inside the casing 110.

The casing 110 is a block cabinet having a substantially hexagonal shape. Specifically, the casing 110 is a combination of six members, i.e., an inlet channel forming plate 111, an outlet channel forming plate 118, an inlet side guide plate 112 (cf., FIG. 4), an outlet side guide plate 113, and two side plates 130 and 131. The internal space of the casing 110 serves as a storage room in which the assembled battery 120 is accommodated and also as a coolant channel in which a coolant (cooled air) for cooling the assembled battery 120 flows.

In the following description, a direction along which the casing 110 has the longest side and a direction from the side of a coolant inlet 114 (cf. FIG. 4) to the side of a coolant outlet 115 are defined as longitudinal directions. A direction in which two sides (two side plates 130 and 131) other than two sides facing in the longitudinal direction of the casing 110 (inlet side guide plate 112 and outlet side guide plate 113) are facing; a direction of central axis of the lithium ion battery cell 140 (a direction in which two electrodes of the positive electrode terminal and the negative electrode terminal are facing); and a direction in which a conductive member (bus bar) that electrically connects two lithium ion battery cells 140 and the two lithium ion battery cells 140 are facing are defined as "shorter side direction". A direction in which the inlet channel forming plate 111 and the outlet channel forming plate 118 are facing is defined as "height direction" regardless of the direction in which the battery module 100 is set.

The inlet channel forming plate 111 is a flat plate of a rectangular shape that forms a top face of the casing 110. The outlet channel forming plate 118 is a flat plate that forms a bottom face of the casing 110. The inlet channel forming plate 111 and the outlet channel forming plate 118 have respective longitudinal ends that are positioned out of alignment in the longitudinal direction. The inlet channel forming plate 111 and the outlet channel forming plate 118 are constituted by thin metal plates having stiffness.

The inlet side guide plate 112 is a plate-like member that forms one of the two opposite sides facing in the longitudinal direction of the casing 110. The outlet side guide plate 113 is a plate-like member that forms the other of the two opposite sides facing in the longitudinal direction of the casing 110. The inlet side guide plate 112 and the outlet side guide plate 113 are constituted by thin metal plates having stiffness.

Between the inlet channel forming plate 111 and the inlet side guide plate 112 is formed of a coolant inlet 114 that constitutes an entrance to the inside of the casing 110 for cooled air serving as the coolant. The coolant inlet 114 is provided with a coolant inlet duct 116 for guiding cooled air to the coolant inlet 114. As mentioned above, the inlet channel forming plate 111 and the outlet channel forming plate 118 are arranged out of alignment with respect to each other and an inlet side end of the casing 110 is formed stepwise. Between the outlet channel forming plate 118 and the outlet side guide plate 113 is formed of a coolant outlet 115 that constitutes an outlet port through which cooled air is released from the inside the casing 110. The coolant outlet 115 is provided with a coolant outlet duct 117 that guides cooled air through the coolant outlet 115 to the outside.

The coolant inlet 114 and the coolant outlet 115 are positioned out of alignment in the height direction (direction in which the inlet channel forming plate 111 and the outlet channel forming plate 118 are facing). That is, the coolant inlet 114 is positioned on the inlet channel forming plate 111 side whereas the coolant outlet 115 is positioned on the outlet channel forming plate 118 side.

In order to make it easier to assemble a battery block, the inlet channel forming plate 111, the outlet side guide plate 113, the coolant inlet 114, and the coolant inlet duct 116 are integrally formed. Also, the outlet channel forming plate 118, the inlet side guide plate 112, the coolant outlet 115, and the coolant outlet duct 117 are integrally formed.

The integrally formed inlet channel forming plate 111, outlet side guide plate 113, coolant inlet 114, and coolant inlet duct 116 and also the integrally formed outlet channel forming plate 118, inlet side guide plate 112, coolant outlet 115, and coolant outlet duct 117 are fabricated by permanent mold casting of metal. As a result, the casing 110 thus obtained has a larger thickness than the cabinet that is formed by sheet metal bending so that it has high strength against load and impact from outside and at the same time exhibits higher dimension precision of screw hole and processed surface than sheet-metal processing, thus making it easier to be assembled with other components.

The inlet channel forming plate 111, outlet channel forming plat 118, inlet side guide plate 112, outlet side guide plate 113, coolant inlet 114, and coolant outlet 115 can be connected with the side plates 130 and 131 by fixing means such as screws, bolts, or rivets (not shown).

The side plates 130 and 131 are flat plate-like members that form two sides facing in the shorter side direction of the casing 110, which are molded articles made of a resin having electric insulation properties, such as polybutylene terephthalate (PBT). The thickness of the side plates 130 and 131 is larger than the thicknesses of the inlet channel forming plate 111, outlet channel forming plate 118, inlet side guide plate 112, and outlet side guide plate 113. Detailed configurations of the side plates 130 and 131 are described later.

On an outer side of the side plates 130 and 131 opposite to the storage room for the assembled battery 120 is provided a cover member 160 called "side cover". FIG. 7 shows only the cover member 160 outside the side plate 130. However, another cover member 160 is provided on an outer side of the side plate 131. The cover member 160 is fixed to the side plate 130 with a fixing means such as bolt or rivet (not shown).

The cover member 160 is a flat plate obtained by pressing a metal plate such an iron plate or an aluminum plate or a flat plate obtained by molding a resin such as PBT, and is configured so as to have substantially the same planar figure as the side plate 130. The cover member 160 has a uniformly inflated area on a side opposite to the side plate 130. This area includes a site that corresponds to a through-hole 132 of the side plate 130 which will be described later. As a result, a space is formed between an outer side of the side plate 130, that is an outer wall surface opposite to the inner wall surface forming the storage room for the assembled battery 120, and the inner wall surface of the cover member 160, that is, a surface of the cover member 160 on the side of the side plate 130. This space is used as a gas discharge space and also as a space that allows the bus bar and voltage detection conductor attached to the side plate 130 to be prevented from contacting the cover member 160.

(Assembled Battery)

The assembled battery 120 is an assembly of a plurality of lithium ion battery cells 140 (lithium ion battery cell group). The plurality of lithium ion battery cells 140 is accommodated in the store room formed inside the casing 110 in alignment and sandwiched by the side plates 130 and 131 in the shorter side direction. The battery cells 140 are electrically connected to each other in series by being connected with a plurality of conductive members called bus bars.

The lithium ion battery cells 140 are each a cylindrical structure and include components such as battery elements and a safety valve and so on accommodated in a battery case in which an electrolyte is filled.

As shown in particularly FIG. 7, the assembled battery cell 120 according to the present embodiment include sixteen (16) lithium ion battery cells 140 each having a cylindrical shape that are arrange inside the casing 110. Specifically, eight (8) lithium ion battery cells 140 are arranged in parallel such that they are on their sides with the central axis of each lithium ion battery cell 140 extending along the shorter side direction to form a first battery cell bank 121. Also, eight (8) lithium battery cells 140 are arranged similarly to the first battery cell bank 121 to form a second battery cell bank 122. The assembled battery 120 is formed by stacking the first battery cell bank 121 and the second battery cell bank 122 in the height direction (either plain stacking in which the central axes of the battery cells in the first and second battery cell banks are aligned or close pack stacking in which the central axes of the battery cells in the first and second battery cell banks are staggered as seen from above).

That is, the assembled battery 120 includes eight (8) rows of the lithium ion battery cells 140 in the longitudinal direction and two stages or two layers of such eight rows stacked in the height direction.

The first battery cell bank 121 and the second battery cell bank 122 are out of alignment with respect to each other in the longitudinal direction. That is, the first battery cell bank 121 is positioned closer to the inlet channel forming plate 111 and arranged out of alignment closer to the coolant inlet 114 side than the second battery cell bank 122 is. On the other hand, the second battery cell bank 122 is positioned closer to the outlet channel forming plate 118 and arranged out of alignment closer to the coolant outlet 115 side than the first battery cell bank 121 is.

For example, the first battery cell bank 121 and the second battery cell bank 122 are arranged out of alignment in the longitudinal direction such that the position (first position) in the longitudinal direction of the central axis of the lithium ion battery cell 140 that is positioned closest to the coolant outlet 115 among the first battery cell bank 121 shall satisfy the following relationship. That is, the first position shall be an intermediate position between the central axis of the lithium ion battery cell 140 that is positioned closest to the coolant outlet 115 in the second battery cell bank 122 and the central position of the lithium ion battery cell 140 that is adjacent to that lithium ion battery cell 140.

The lithium ion battery cells 140 that constitute the first battery cell bank 121 are arranged in parallel with the orientation of the terminals being alternately in reverse orientation. Similarly, the lithium ion battery cells 140 that constitute the second battery cell bank 122 are arranged in parallel with the orientation of the terminals being alternately in reverse orientation.

However, the order in which the terminals of the lithium ion battery cells 140 that constitutes the first battery cell bank 121 are arranged from the coolant inlet 114 side to the coolant outlet 115 side is different from the order in which the terminals of the lithium ion battery cells 140 that constitute the second battery cell bank 122. That is, in the first battery cell bank 121, the terminals of the lithium ion battery cells 140 facing the side plate 130 are arranged in the order of negative electrode terminal, positive electrode terminal, . . . , positive electrode terminal in the direction from the coolant inlet 114 toward the coolant outlet 115. On the other hand, in the second battery cell bank 122, the terminals of the lithium ion battery cells 140 facing the side plate 130 are arranged in the order of positive electrode terminal, negative electrode terminal, positive electrode terminal, . . . , negative electrode terminal in the direction from the coolant inlet 114 toward the coolant outlet 115.

In this manner, by arranging the first battery cell bank 121 and the second battery cell bank 122 out of alignment in the longitudinal direction, the size of the assembled battery 120 in the height direction can be reduced, so that the higher potential side battery block 100a can be down sized in the height direction.

(Side Plates)

Now, configuration of the side plates 130 and 131 that sandwich the assembled battery 120 is described in detail. Here, for easier understanding, configuration of one side plate 130 only is explained. However, the configuration of the other side plate 131 is basically the same as the side plate 130.

Though not shown, the side plate 130 is provided with a positive electrode side connection terminal connected to a positive electrode of the highest potential side cell of the assembled battery 120 and a negative electrode side connection terminal connected to a negative electrode of the lowest potential side cell that are arranged on an upper surface of the side plate 130, that is, on the face of the inlet channel forming plate 111 side, side by side in the longitudinal direction. The positive and negative electrode side connection terminals are connected to positive and negative electrode direct current power input and output terminals (not shown), respectively, which are configured as subassembly separately from the battery module 100.

In case of the higher potential side battery block 100a, a positive electrode side power source cable (not shown) is connected to the positive electrode side connection terminal, and a terminal of a cable (not shown) electrically connected to one end of the SD switch 700 is connected to the negative electrode side connection terminal. In case of the lower potential side battery block 100b, a terminal of the cable (not shown) that is electrically connected to the other side of the SD switch 700 is connected to the positive electrode side connection terminal and a terminal of the negative electrode side power source cable (not shown) is connected to the negative electrode side connection terminal.

As shown in FIG. 7, the side plate 130 is in the form of a substantially rectangular plate having formed therein sixteen (16) circular through-holes in the shorter side direction. The through-holes 132 are arranged so that their openings correspond to the positions of the electrodes of the sixteen lithium ion battery cells 140. Therefore, when the assembled battery 120 is accommodated in the casing 110, each through-hole 132 of the side plate 130 is blocked by the surface of terminal on one side of the corresponding lithium ion battery cell 140, and the through-hole 132 of the side plate 131 is blocked by the surface of the terminal on the other side of the lithium ion battery cell 140. The positive and negative electrodes of the lithium ion battery cell 140 are electrically connected through a bus bar (conductive member) (not shown) arranged in association with the through-holes 132 of the side plates 130 and 131. The bus bar is TIG welded on the positive and negative electrodes of the battery cell. The bus bars are positioned by being attached to the side plates 130 and 131.

As shown in FIGS. 6 and 7, a connection terminal 810 is provided on the top side of the side plate 130, i.e., on the side of the inlet channel forming plate 111. The connection terminal 810 is molded integral to the side plate 130 by using the same molding material as that of the side plate 130 and is arranged on the coolant inlet 114 side on the top side of the side plate 130. Each connection terminal 810 electrically connects wiring (connecting wire) 800 extending from a voltage detection connector 912 of the control unit 900 with a plurality of voltage detection conductors (not shown) which will be described later.

As shown in FIGS. 4 and 5, the voltage detection connector 912 is arranged on both ends in the shorter side direction of the control unit 900. The connecting wire 800 connected to the two connection terminals 810 provided on the side plates 130 and 131, respectively, of the higher potential side battery block 100a is connected to the connector 912 of the control unit 900 arranged above the higher potential side battery block 100a. On the other hand, the connecting wire 800 connected to the two connection terminals 810 provided on the side plates 130 and 131, respectively, of the lower potential side battery block 100b is connected to the connector 912 of the control unit 900 arranged above the lower potential side battery block 100b.

To the voltage detection connector 912 is connected a plurality of voltage detection conductors that detect voltage of thirty two (32) battery cells 140. Each voltage detection conductor is connected to the bus bar that connects the lithium ion battery cells 140 in series. The plurality of voltage detection conductors is prefabricated as a subassembly with a resin and the prefabricated assembly is integrally molded with the side plates 130 and 131 by, for example, insert-mold forming. A distal end of each voltage detection conductor is TIG welded to the bus bar.

—Control Unit—

Now, the configuration of the control unit 900 is explained.

As shown in FIGS. 4 and 5, the control unit 900 is mounted on the battery module 100. Specifically, the control unit 900 is mounted so as to bridge the higher potential side battery module 100a and the lower potential side battery module 100b.

Figure 8:
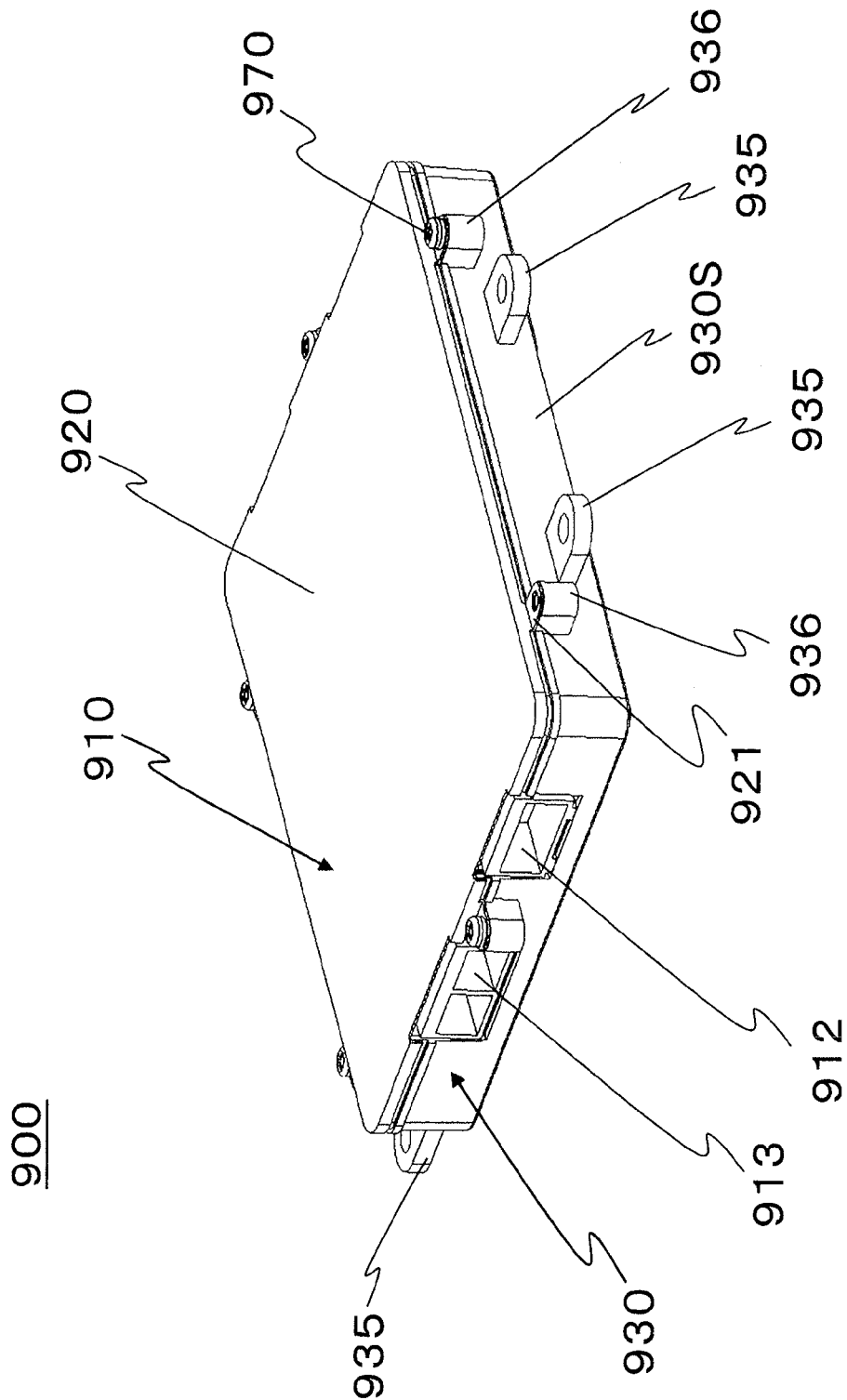
FIG. 8 presents a perspective view showing an appearance configuration of a monitor unit in whole that constitutes the electric storage device shown in FIG. 4.
Figure 9:
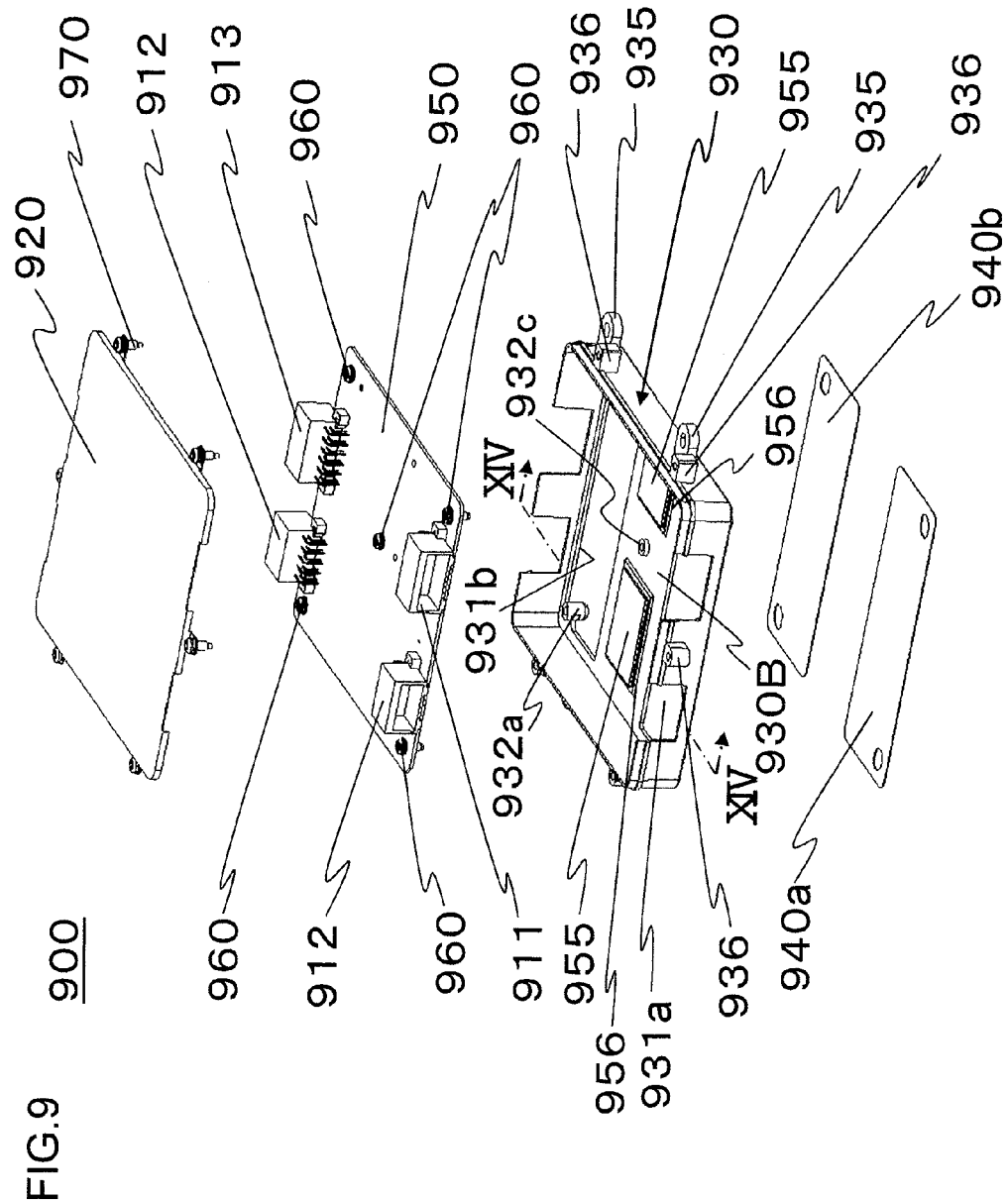
FIG. 9 presents an exploded perspective view of the monitor unit shown in FIG. 8.
Figure 10:
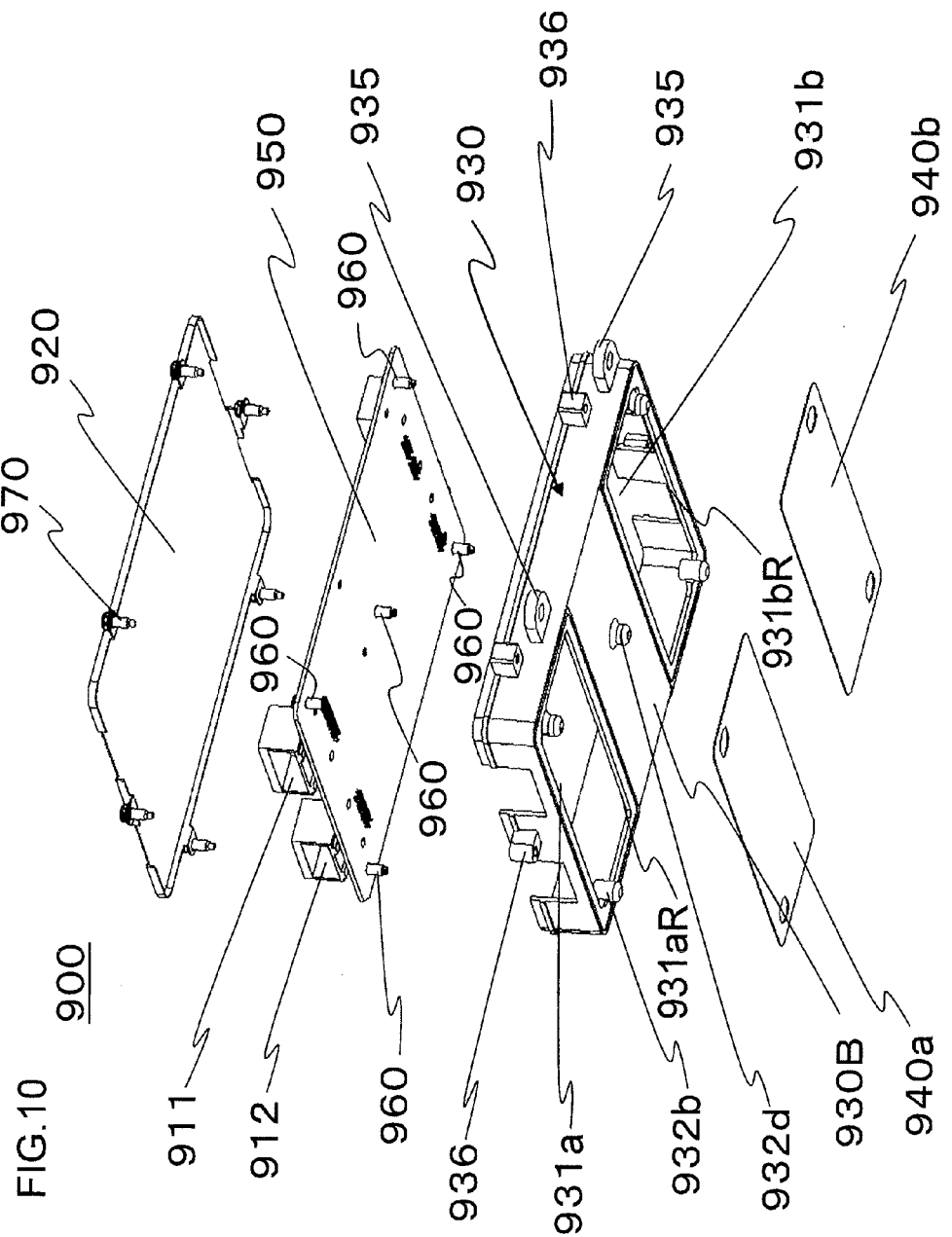
FIG. 10 presents an exploded perspective view as seen from the bottom side of the monitor unit shown in FIG. 8.

As shown in FIGS. 8 to 10, the control unit 900 include as main components a substantially hexahedral cabinet 910 and a substantially rectangular circuit board 950 accommodated inside the cabinet 910. The circuit board 950 is provided thereon the cell controller 200, the battery controller 300, and their peripheral circuits (power source circuit 301 and so on) shown in FIGS. 1 to 3.

The cabinet 910 is a flat, rectangular metal box that includes a cabinet cover (second metal member) 920 that forms a top side of the cabinet 910 and a cabinet case (first metal member) 930 that forms a bottom side and sides of the cabinet 910. The cabinet case 930 includes a substantially rectangular bottom plate 930B. An outer surface of the bottom plate 930B is taken as a lower side of the cabinet 910.

The cabinet case 930 is formed by permanent mold casting of a metal and is thicker than a cabinet formed by bending sheet metal. As a result, the cabinet case 930 has high strength against load and impact from outside and exhibits higher dimensional precision of screw holes and processed surfaces than sheet metal processing, so that it is easier to assemble the cabinet case 930 with other components. The cabinet cover 920 is formed by pressing a thin metal plate such as an iron plate or an aluminum plate.

An outer wall surface 930S that forms a side surface of the cabinet case 930 is provided with a plurality of bosses 936. A periphery of the cabinet cover 920 is bent down in order to increase its strength and forms a part of the side surface of the cabinet 910. On the periphery of the cabinet cover 920 is formed a plurality of bosses 921 (cf., particularly FIG. 15) by being bent down and then horizontally. The bosses 921 correspond to the bosses 936, respectively.

The bosses 921 protrude laterally in parallel to the bottom side of the cabinet 910 and along each boss 936 at a position stepped down from the top side of the cabinet 910 (top side of the cabinet cover 920). On the top side of the boss 936 is formed female screw (internal thread) and a through-hole is provided in the boss 921 at a position that corresponds to the position of the female screw. A screw 970 is inserted into the through-hole from above and engaged with a female screw in the boss 936. With this configuration, the boss 921 is fixed to the boss 936 and the cabinet cover 920 is fixed to the cabinet case 930.

On the side 930S opposite to the cabinet case 930 in the longitudinal direction, a plurality of bosses 935 is provided at a position closer to the bottom side than the boss 936 is and protrudes toward outer side of the case. The boss 935 is providing with a through-hole in the height direction. As shown in FIGS. 5 and 6, a boss 119 is provided in the height direction on the top side of the inlet channel forming plate 111 that constitutes the battery module 100.

The control unit 900, the higher potential side battery block 100a and the lower potential side battery block 100b connected and fixed to the plurality of bosses 935 of the cabinet case 930 and the plurality of bosses 119 provided on the top side of the inlet channel forming plate 111 by means of fixing means such as screw.

As shown in FIGS. 9 and 10, the bottom plate 930B of the cabinet case 930 is formed of substantially rectangular openings 931a and 931b. On bottom periphery of the openings 931a and 931b are provided stepped portions 931aR and 931bR (cf., FIG. 10, particularly FIG. 13). The stepped portions 931aR and 931bR are formed by a protrusion that extends from the bottom side of the bottom plate 930B like a rectangular rim. In the stepped portions 931aR and 931bR are fitted and fixed insulating plates 940a and 940b, respectively. For fixing the insulating plates 940a and 940b, a pressure-sensitive adhesive double coated tape and an adhesive can be used. The insulating plates 940a and 940b are formed by coating an insulating sheet such as rubber sheet on both sides of a thin sheet of metal, such as iron or aluminum and hence has both shape keeping property and insulating property.

At four corners of the bottom plate 930B in the cabinet case 930 are provided four corner internal bosses 932a that protrude inwardly from the case and four corner external bosses 932b that protrude outwardly from the case. In the center of the bottom plate 930B are provided a central internal boss that protrudes inwardly from the case and a central external boss 932d that protrudes outwardly from the case.

The circuit board 950 is provided with a through-hole for attachment at each corner and in the center thereof and screws 960 are inserted into the respective through-holes from above. The four corner internal bosses 932a, the four corner external bosses 932b, the central internal boss 932c, and the central external boss 932d are each formed of a continuous female screw corresponding to the screw 960. That is, the four corner internal bosses 932a and the four corner external bosses 932b form a continuous female screw with a sufficient number of threads and the central internal boss 932c and the central external boss 932d form a continuous female screw with a sufficient number of threads.

The screw 960 ingresses through the four corner internal boss 932a and into the four corner external boss 932b to engage with the four corner internal boss 932a and the four corner external boss 932b. Also, the screw 960 ingresses into the central external boss 932d through the central internal boss 932c and it is threadably mounted on the central internal boss 932c and the central external boss 923d. As a result, the circuit board 950 is fixed to the cabinet case 930 with a sufficient strength.

The four corner bosses 932a and the central internal boss 932c protrude upwards from inside the bottom plate 930B and the circuit board 950 is supported by the top side which are the tips of the four corner internal bosses 932a and the central internal boss 932c, so that the circuit board 950 is arranged in the cabinet remote from the top side (inner face) of the bottom plate 930B. As a result, the circuit board 950 does not contact the bottom plate 930B and the circuit board 950 is securely insulated from the cabinet case 930. By adjusting the heights of the four corner internal bosses 932a and the central internal boss 932c, the height of the circuit board 950 can be adjusted.

As shown in FIG. 9, a plurality of electronic components (not shown) and a plurality of connectors 911, 912, and 913 are connected by soldering to the top side of the circuit board 950. On the bottom side of the circuit board 950 protrude extremities of leads 980 of connectors and electronic components (cf., FIGS. 11 and 14). Examples of the connectors include a voltage detection connector 912, a temperature detection connector 913, and an external connection connector 911.

On side surfaces of the cabinet case 930 in the shorter side direction is provided with a plurality of notches in order to expose the connectors 911, 912, and 913 to the outside of the cabinet case 930. To the voltage detection connector 912 is connected a connector of the connection wiring 800 that is electrically connected to the thirty two (32) lithium ion battery cells 140. To the temperature detection connector 913 is connected a connector (not shown) for signal lines of a plurality of temperature sensors (not shown) arranged inside the battery module 100.

Figure 16:
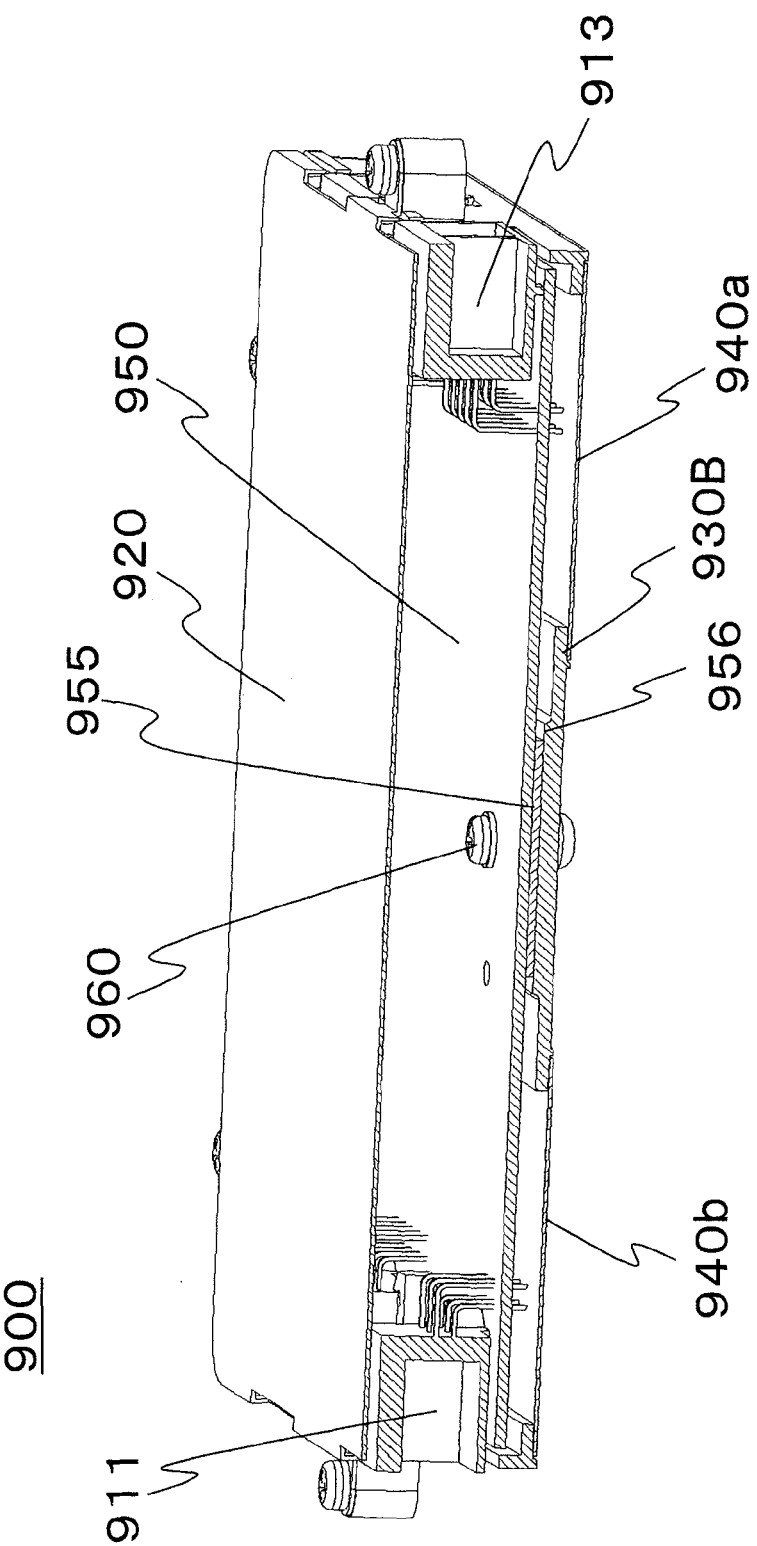
FIG. 16 presents a cross-sectional view along the line XIV-XIV in FIG. 9.

As shown in FIGS. 9 and 16, a boss 956 is provided on the top side of the bottom plate 930B of the cabinet case 930. The top side of the boss 956 is surface treated and a heat release sheet 955 made of an insulating material having high thermal conductivity is attached onto this side. The height of the boss 956 and the thickness of the heat release sheet 955 are set such that the top side of the heat release sheet 955 can contact the bottom side of the circuit board 950 attached to the cabinet case 930.

The heat release sheet 955 is applied on one surface thereof a silicone resin sheet having adhesiveness and is stuck to the top side of the boss 956. It is preferred that the heat release sheet 955 is arranged below an electronic component in the circuit board 950 which component generates much heat, for example, the power source circuit 301 shown in FIG. 1.

With this heat release sheet 955, the heat generated by the electronic component of the circuit board 950 is transferred from the heat release sheet 955 to the cabinet case 930 and then to the casing 110 of the battery block 100. Inside the battery block casing 110, air for cooling the battery cell is blown. As a result, the casing 110 is cooled by exchange of heat with cooling wind, so that the heat generated by the electronic component can be efficiently released.

Now, dimension setting of each part of the control unit 900 as mentioned above and advantageous effect thereby are explained in detail.

Figure 15:
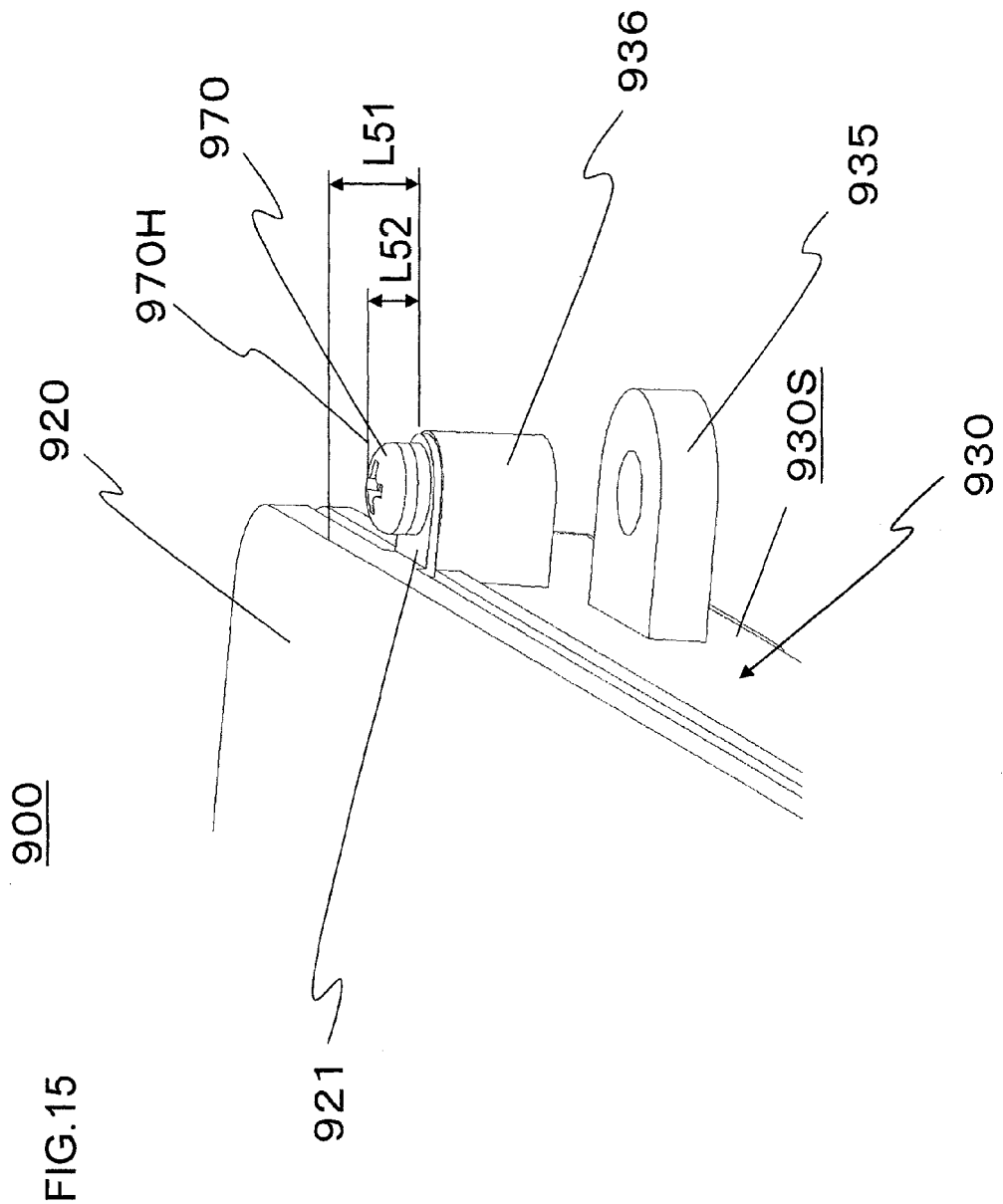
FIG. 15 presents a diagram showing a cabinet fastener of the monitor unit.

(1) According to the above-mentioned embodiment, a screw head of the screw 970 with which the cover 920 is attached to the case 930 is designed not to protrude from the top side of the cover 920 in the control device 900. That is, as mentioned above, the cabinet 910 includes the cabinet cover 920 that forms top side of the cabinet 910 and the cabinet case 930 that forms the bottom side and lateral sides of the cabinet 910. The boss 921 of the cabinet cover 920 is mounted on the boss 936 of the cabinet case 930, and these are fastened with the screw 970. As shown in FIG. 15, the top side of the boss 921 has a step L51 with respect to the top side of the cabinet cover 920 and the screw 970 has a top side 970H that protrudes upward from the top side of the boss 921. The height L52 of the top side 970H is set so that it satisfies formula (1) below. Therefore, the top side 970H of the screw 970 will not protrude upward from the top side of the cabinet 910.

$$L52 < L51 \quad (1)$$

As mentioned above, the bosses 921 and 936 for fixing the cabinet case 930 and the cabinet cover 920 with the screw 970 are provided on the outer wall 930S that forms lateral sides of the cabinet 910. The step between the top side of the boss 921 and the top side of the cabinet cover 920 is made larger than the height of the top side 970H of the screw 970. As a result, the height of the cabinet 910 in the control unit 900 can be suppressed.

(2) According to the above-mentioned embodiment, the following structures are adopted to secure necessary length for threadably mounting a screw in order to fasten the circuit board 950 to the case 930 while controlling the height of the top side of the control unit 900 attached to the casing 110. According to the present embodiment, the internal boss 932a is protruded inwardly from the top side of the bottom plate 930B and the external boss 932b is protruded outwardly from the bottom side of the bottom plate 930B. In the center of the bottom plate 930B, the internal boss 932c is protruded toward the inside the case from the top side of the bottom plate 930B and the external boss 932d is protruded outwardly from the bottom side of the bottom plate 930B. The external bosses 932b and 932d are provided in order to form a continuous female screw with a sufficient number of threads by the four corner internal bosses 932a and the four corner external bosses 932b and also to form a continuous female screw with a sufficient number of threads by the central internal boss 932c and the central external boss 932d. With this configuration, the circuit board 950 can be firmly fastened to the cabinet case 930 with the screw 960.

However, since the external bosses 932b and 932d protrude from the bottom side of the bottom plate 930B, the height at which the control unit 900 is attached becomes larger if a sufficient distance is set between the inlet channel forming plate 111 and the bottom plate 930B.

(3) Then, according to the present invention, the inlet channel forming plate 111 is provided with a re-entrant or depressed portion 111a and a gap 100D (cf., FIG. 13) is formed between the battery blocks 100a and 100b to accommodate the external bosses 932b and 932d in the resultant space, thus controlling the height at which the control unit 900 is attached.

As mentioned above, the cabinet 910 is fixed as bridging the higher potential side battery block 100a and the lower potential side battery block 100b. That is, the plurality of bosses 935 of the cabinet case 930 is mounted on the respective top sides of the plurality of bosses 119 provided on the top side of the inlet channel forming plate 111 of each of the battery blocks 100a and 100b and fixed with screws. As shown in FIG. 14A, according to the present embodiment, five (5) external bosses 932b and 932d protrude by a protrusion amount L7 from the bottom side of the bottom plate 930B of the cabinet case 930. Assuming that a distance between the lowermost surface of the bottom plate 930B and the top side of the inlet channel forming plate 111 is L8, the protrusion amount L7 is larger than the distance L8.

Figure 11:
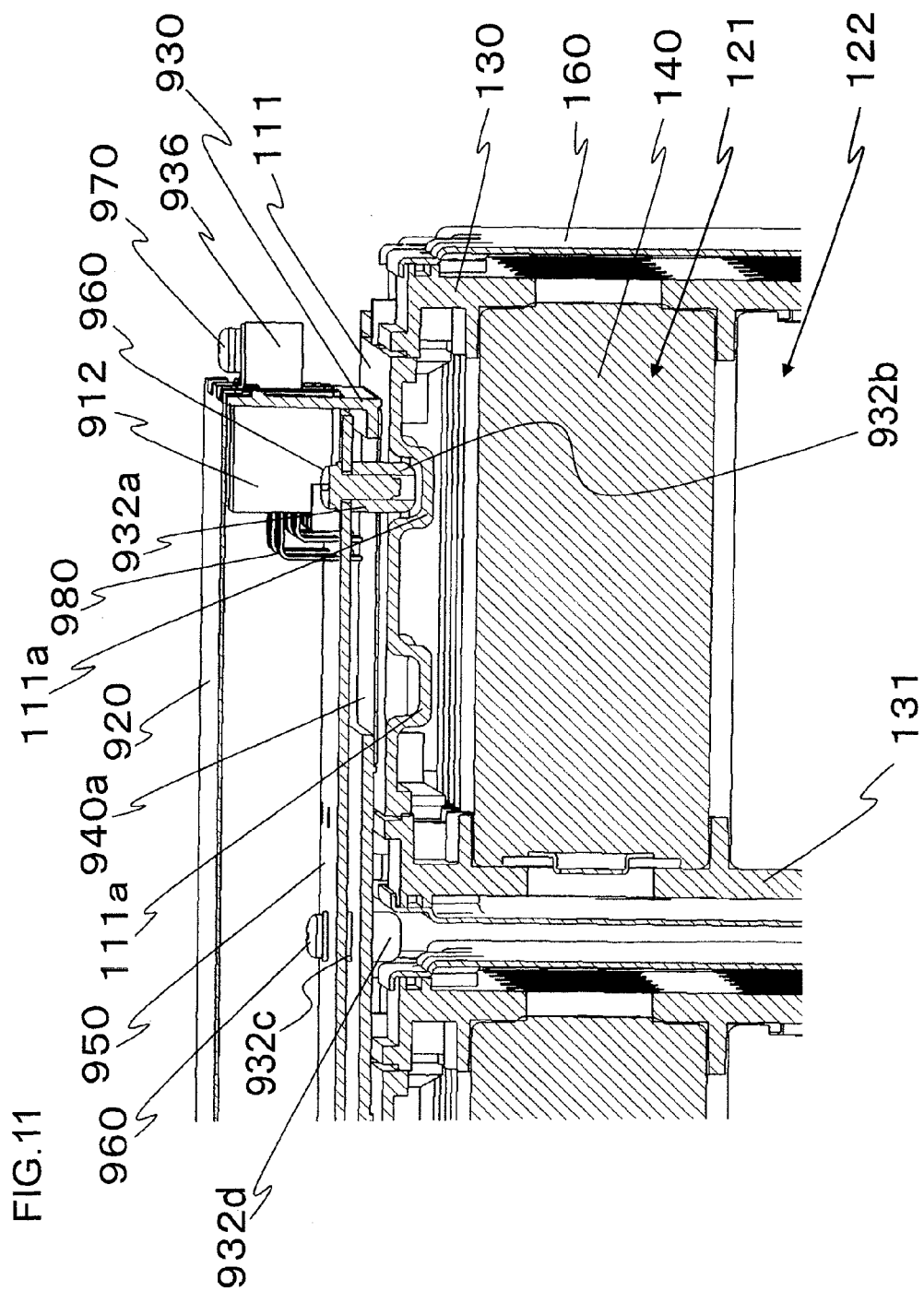
FIG. 11 presents a cross-sectional view illustrating positional relationship between the monitor unit shown in FIG. 8 and the battery block.
Figure 12:
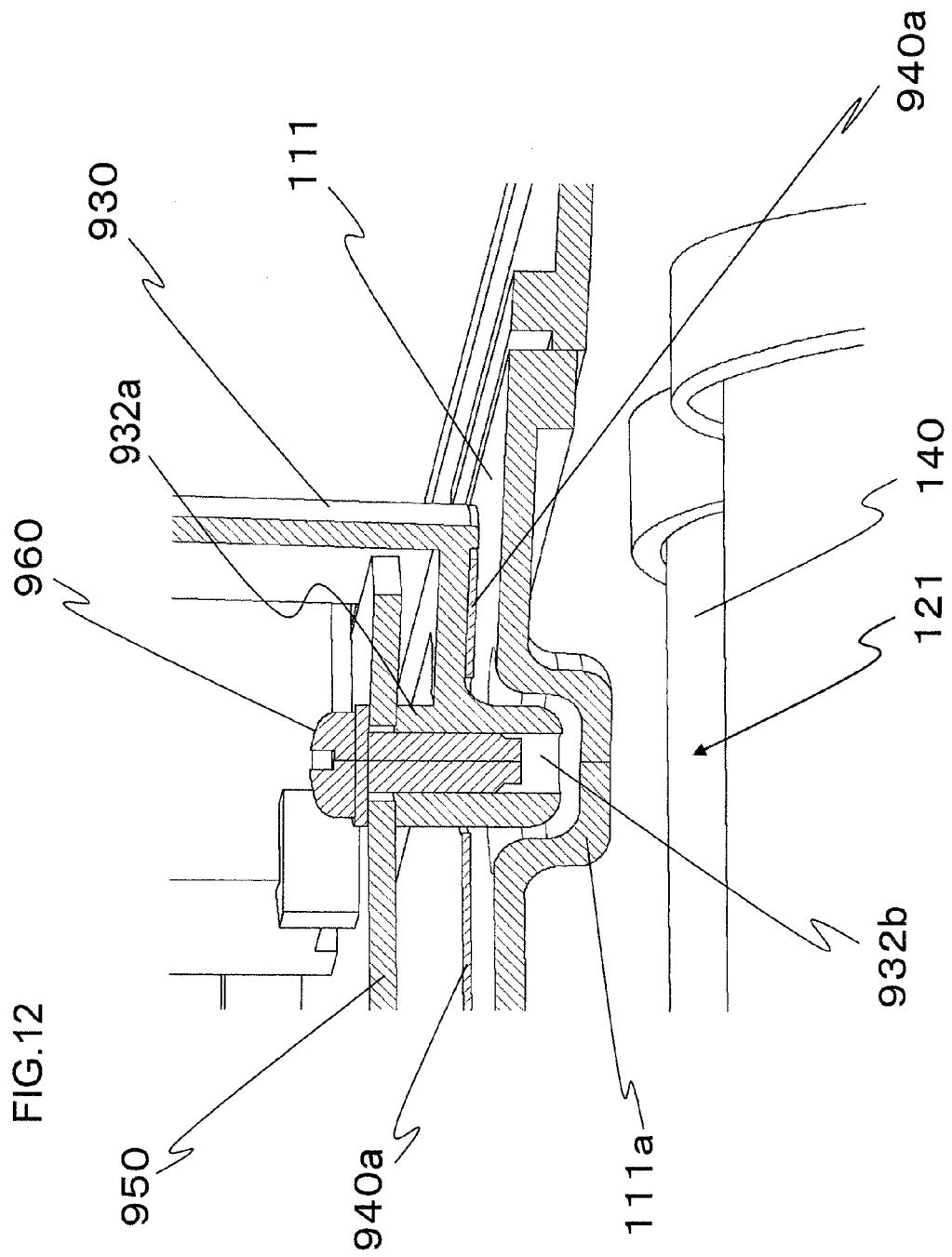
FIG. 12 presents a detail view illustrating the positional relationship between the monitor unit and an input flow channel forming plate of the battery block.

According to the present embodiment, as shown in FIGS. 11 and 12, a plurality of depressed portions 111a is provided on the top side of the inlet channel forming plate 111 of the casing 110 at positions corresponding to the four corner external bosses 932b, respectively. Therefore, the four corner external bosses 932b are accommodated in the depressed portions 111a, respectively.

Figure 13:
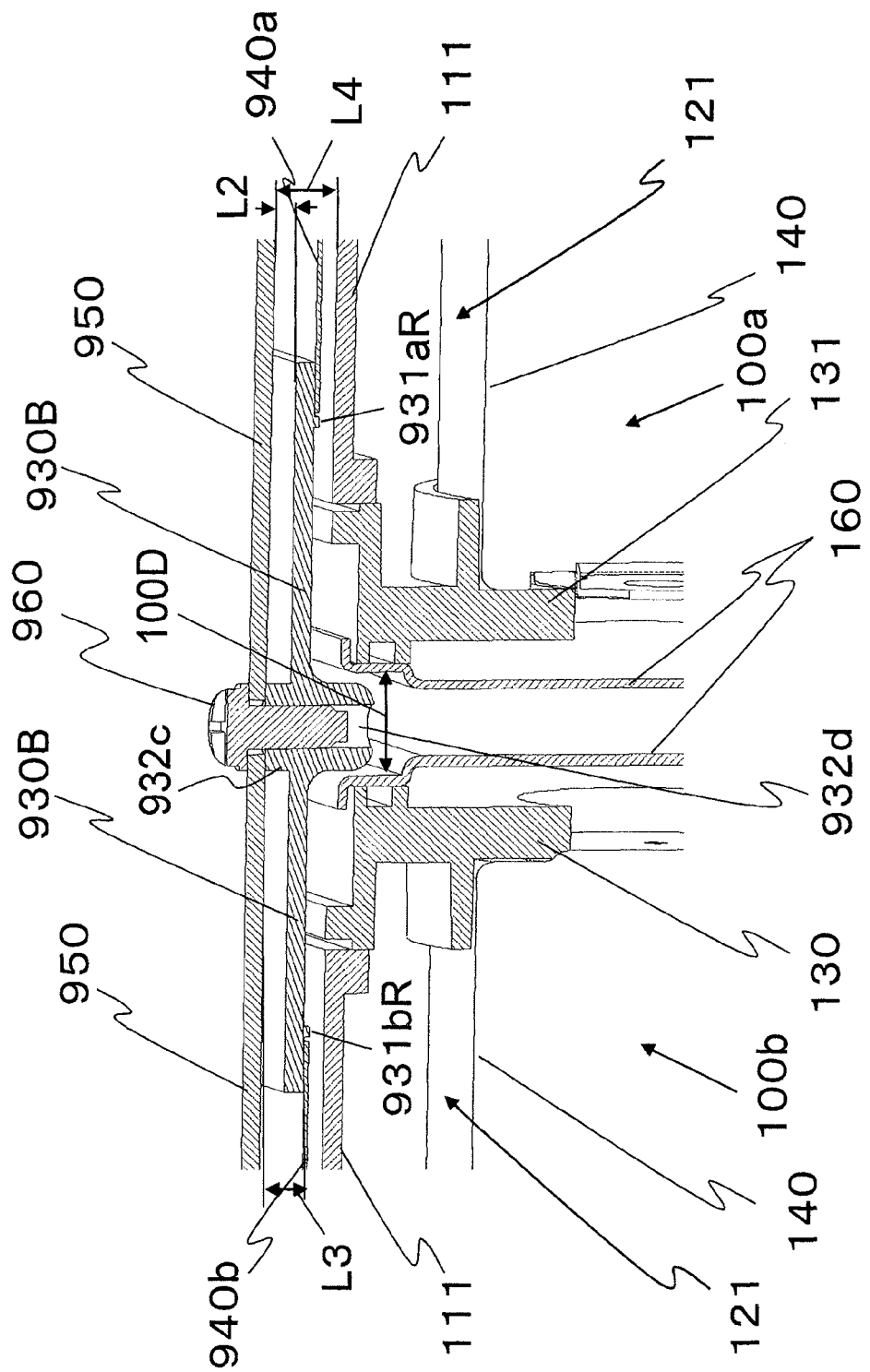
FIG. 13 presents a detail view illustrating the positional relationship between the monitor unit shown in FIG. 11 and the battery block.

On the other hand, as shown in FIG. 13, the battery blocks 100a and 100b are fixed to the module base 101 such that a space 100D is formed between the corner member 160 attached to an external side of the side plate 130 for one battery block and the cover member 160 attached to an external side of the side plate 131 for the other battery block. As shown in FIGS. 11 and 13, the central external boss 932d that protrudes outwardly from the center of the bottom side of the bottom plate 930B in the cabinet case 930 is arranged at the position of the space 100D between the higher potential side battery block 100a and the lower potential side battery block 100b, and is accommodated within the space 100D entirely along the height thereof.

As mentioned above, according to the present embodiment, the depressed portion 111a on the top side of the inlet channel forming plate 111 and the space 100D between the battery blocks 100a and 100b are formed and five (5) external bosses 932b and 932d are positioned in this space, so that the height at which the control unit 900 is attached can be controlled while securing a sufficient screw thread length of the screw that fastens the circuit board 950 to the case 930.

The respective bosses 119 of the higher potential side battery block 100a and the lower potential side battery block 100b are connected and fixed through the control unit 900. As a result, the control unit 900 serves as a support/reinforcing member in the battery module 100 so that the strength of the battery module 100 can be improved.

(4) According to the above-mentioned embodiment, the lead 980 protrudes from a back side of the circuit board 950, so that it is necessary to secure a predetermined insulating distance between the top of the lead 980 and the bottom plate 930B of the cabinet case 930. On the other hand, it is necessary to control the height at which the control unit 900 is attached. Then, according to the present embodiment, the following structure is adopted in order to secure insulating property between the lead 980 and the cabinet case 930 while controlling the height of the top side of the control unit 900.

(a) As mentioned above, the bottom plate 930B of the cabinet case 930 is provided with substantially rectangular openings 931a and 931b having formed of stepped portions 931aR and 931bR (cf., FIG. 10). In the stepped portions 931aR and 931bR are fitted and fixed insulating plates 940a and 940b from the bottom side.

Assuming that a protrusion height of the lead 980 of the connector 912 from the bottom side of the circuit board 950 is L1, a distance of the top side of the bottom plate 930B from the extremities of the four corner internal bosses 932a and the central internal boss 932c is L2, and a distance of extremities of the four corner internal bosses 932a and the central internal boss 932c from the surface of the insulating plates 940a and 940b is L3, relationship of the parameters L1, L2, and L3 is set as indicated by formula (2) below.

$$L2<L1<L3 \tag{2}$$

According to the condition indicated by the formula (2) above, an extremity of the lead 980 can be made closer to the insulating plates 940a and 940b within the openings 931a and 931b without causing the extremity of the lead 980 to protrude downward from the openings 931a and 931b of the bottom plate 930B. If the extremity of the lead 980 contacts the insulating plates 940a and 940b, no short-circuiting will occur. However, it is desirable to make some clearance therebetween to prevent unnecessary reaction of the insulating plates 940a and 940b on the lead 980.

(b) Instead of the insulating plats 940a and 940b that have coated an insulating material on both sides thereof, an insulating plate that has coated an insulating material on only a surface that faces the circuit board 950, an insulating plate that has coated an insulating material on only a back surface that faces the battery block, or a metal plate having coated no insulating material on each side may be used to block the openings 931a and 931b. In this case, the condition of the sizes is as indicated by the formula (2) above.

(c) The purpose of blocking the openings 931a and 931b with a blocking plate is to prevent invasion of dust into the cabinet case. However, the blocking plate may be omitted to leave the openings 931a and 931b in an open state. In this case, the condition of sizes is as follows.

Assuming a protrusion height of the lead 980 of the connector 912 from the bottom side of the circuit board 950 is L1, a distance of the extremities of the four corner internal bosses 932 and the central internal boss 932c from the top side of the bottom plate 930B is L2, and a distance of the extremities of the four corner internal bosses 932a and the central internal boss 932c from the top side of the casing 110 is L4, the size condition can be set as indicated by formula (3) below.

$$L2<L1<L4 \tag{3}$$

Under the condition indicated by formula (3), the extremity of the lead 950 can be protruded from the openings 931a and 931b, so that the effect of reducing the height at which the control unit 900 is attached is improved further.

(d) By setting the thicknesses of the insulating plates 940a and 940b as described below, the distance between the back sides of the insulating plates 940a and 940b and the top side of the casing 910 can also be controlled. Assuming that the thickness of the insulating plates 940a and 940b is L5, and the depth of the stepped portions 931aR and 931bR is L6, as shown in FIGS. 14A and 14B, the size condition is set as indicted by formula (4). Therefore, the insulating plates 940a and 940b do not protrude from the lowest surface of the stepped portions 931aR and 931bR, that is, the lowest surface of the case 930.

$$L5<=L6 \tag{4}$$

(e) Instead of the condition indicated by formula (4), the condition indicated by formula (5) below may be adopted. Assuming the thickness of the insulating plates 940a and 940b is L5, and the distance between the bottom side of the bottom plate 930B and the top side of the casing 111 is L8 as shown in FIGS. 13, 14A and 14B, then the condition may be set as indicated by formula (5) below.

$$L6<L5<(L6+L8) \tag{5}$$

(5) According to the present embodiment, the four corner internal bosses 932a and the central internal boss 932c protrude upward from inside the bottom plate 930B and the circuit board 950 is supported at the extremities of the four corner internal bosses 932a and the central internal boss 932c, so that the circuit board 950 is separated from the top side (inner side) of the bottom plate 930B. As a result, the circuit board 950 does not contact the bottom plate 930B so that insulating property of the circuit board 950 from the cabinet case 930 can be secured.

(6) According to the present embodiment, the bottom side of the circuit board 950 is designed to be in contact with the bottom plate 930B of the cabinet case 930 through the heat discharge sheet 955. Therefore, the heat generated by electronic components that are mounted on the circuit board 950 is transferred from the cabinet case 930 to the casing 110 so that the electronic components can effectively discharge the heat.

(Variation)

The battery module according to the embodiment explained above may be varied as follows.

(A) According to the above-mentioned embodiment, the cabinet cover 920 is fixed to the cabinet cover 930 by using the screw 970 that is inserted from above the boss 921 and is threadably mounted on the boss 936. However, the following variation may be adopted.

(1) A fastening structure may be adopted that includes the boss 936 formed of a through-hole, a screw that is inserted into the through-hole from below, and a nut that is threadably mounted on the screw on the top side of the boss 21.

(2) A fastening structure may be adopted in which a tap screw is implanted in the boss 936 so as to penetrate the through-hole of the boss 921 and a nut is threadably mounted on the tap screw.

(B) According to the above-mentioned embodiment, two openings 931*a* and 931*b* are formed. However, one opening or more than two openings may be formed. The size of the openings 931*a* and 931*b* may be freely set as far as it is smaller than that of the bottom plate 930B. The openings 931*a* and 931*b* may be provided only on a position that faces the lead 980 protruding from the bottom side of the circuit board 950.

(C) According to the above-mentioned embodiment, the four corner external bosses 932*b* and the central external boss 932*d* provided on the bottom side of the bottom plate 930B are accommodated in the depressed portion 111*a* and space 100D provided in the casing 110 of the battery module 100. However, when the circuit board 950 is not fixed to the cabinet case 930 at its center but is fixed at the four corners only, it may also be configured such that accommodation of the boss by the space 100D is omitted and the bosses are accommodated only by the depressed portion 111*a*.

(D) According to the above-mentioned embodiment, the battery module 100 includes two battery blocks 100*a* and 100*b* and the cabinet 910 of the control unit 900 is mounted so as to bridge the battery blocks 100*a* and 100*b*. The present invention can be applied to an electric storage device in which the cabinet of the control unit is set on one battery block.

The present invention is not limited to the above-mentioned embodiment and variation.

The above described embodiments are examples and various modifications can be made without departing from the scope of the invention.

What is claimed is:

1. An in-vehicle electric storage device, comprising:
a battery block including a metal casing and a plurality of battery cells accommodated in the metal casing;
a control unit including a metal cabinet and a circuit board accommodated in the metal cabinet on which an electronic component is mounted, the control unit being set up on a top side of the battery block and monitoring a physical state of each of the plurality of the battery cells; wherein
the cabinet includes a case having a bottom plate and an open top surface and a cover that closes the open top surface of the case,
the case has an internal boss and an external boss on the bottom plate, the internal boss protruding toward inside of the case from a top side of the bottom plate and the external boss protruding toward outside the case from a bottom side of the bottom plate,
the circuit board is set up on a top side of the internal boss, and
a top side of the casing is provided with a depressed portion in which the external boss is accommodated.

2. An in-vehicle electric storage device according to claim 1, wherein
the in-vehicle electric storage device includes a plurality of the battery blocks, and
the cabinet is connected and fixed to a top side of the plurality of the battery blocks so as to bridge them.

3. An in-vehicle electric storage device according to claim 1, wherein
a connector that is mounted on the circuit board, a lead of the connector protruding from a bottom side of the circuit board, and
the bottom plate of the case is provided with an opening that faces the connector.

4. An in-vehicle electric storage device according to claim 1, wherein a heat conduction member that causes the circuit board and the case to thermally contact each other is provided on the top side of the bottom plate, and the heat conduction member is contacting the circuit board.

5. An in-vehicle electric storage device according to claim 3, wherein
assuming a protrusion length of the lead that protrudes from the bottom side of the circuit board is S1, a protrusion height of an internal boss of the bottom plate is S2, and a distance between an extremity of the internal boss and a top side of the casing of the battery block is S3, S1, S2 and S3 satisfy a relationship of:

$$S2<S1<S3.$$

6. An in-vehicle electric storage device according to claim 5, wherein
the opening of the case is blocked by a blocking plate fixed to an outer side of the case, and
assuming that a distance between the extremity of the internal boss and a top side thereof that faces the circuit board is S4, S1, S2 and S4 satisfy a relationship of:

$$S2<S1<S4.$$

7. An in-vehicle electric storage device according to claim 6, wherein
the blocking plate is a metal plate having provided an insulating material on one surface thereof that faces an inside of the cabinet, a metal plate having provided an insulating material on each side thereof, or a metal plate having no insulating material on each side thereof.

8. An in-vehicle electric storage device according to claim 6, wherein
a protrusion surrounding the opening is provided on the bottom side of the bottom plate,
the blocking plate is provided at a stepped portion surrounded by the protrusion, and
assuming that a thickness of the blocking plate is S5, and a protrusion height of the protrusion is S6, S5 and S6 satisfy a relationship of:

$$S5 \leq S6.$$

9. An in-vehicle electric storage device according to claim 6, wherein
a protrusion surrounding the opening is provided on a bottom side of the bottom plate,
the blocking plate is provided at a stepped portion surrounded by the protrusion, and
assuming that a thickness of the blocking plate is S5, a protrusion height of the protrusion is S6, and a distance between the protrusion and the top side of the casing of the battery block is S7, S5, S6 and S7 satisfy a relationship of:

$$S6<S5<(S6+S7).$$

10. An in-vehicle electric storage device according to claim 1, wherein
a plurality of bosses that protrude outward is provided on a side surface of the case,
the cover is provided with a plurality of bosses that protrude laterally along each boss of the case, a top side of each of the plurality of bosses of the cover protrudes by a difference in level S8 lower than a top side of the cover,
the bosses of the case and the bosses of the cover are fastened with screws, each of the screws contains a top surface area that protrudes upward from the top side of the bosses of the case by a height S9, and
S8 and S9 satisfy a relationship of:

$$S9<S8.$$

* * * * *